US012566506B2

(12) United States Patent
Tao et al.

(10) Patent No.: US 12,566,506 B2
(45) Date of Patent: Mar. 3, 2026

(54) HAPTIC FEEDBACK MODULE AND HAPTIC FEEDBACK DEVICE

(71) Applicants:BEIJING BOE TECHNOLOGY DEVELOPMENT CO., LTD., Beijing (CN); BOE Technology Group Co., Ltd., Beijing (CN)

(72) Inventors: Yongchun Tao, Beijing (CN); Dexing Qi, Beijing (CN); Zhihui Chen, Beijing (CN); Jiawen Zhang, Beijing (CN); Yingzi Wang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/994,164

(22) PCT Filed: May 17, 2024

(86) PCT No.: PCT/CN2024/093824
§ 371 (c)(1),
(2) Date: Jan. 14, 2025

(87) PCT Pub. No.: WO2025/001616
PCT Pub. Date: Jan. 2, 2025

(65) Prior Publication Data
US 2026/0016898 A1      Jan. 15, 2026

(30) Foreign Application Priority Data
Jun. 29, 2023    (CN) ......................... 202310786427.8

(51) Int. Cl.
G06F 3/01          (2006.01)
G06F 3/041          (2006.01)

(52) U.S. Cl.
CPC ........... G06F 3/016 (2013.01); G06F 3/0416 (2013.01)

(58) Field of Classification Search
CPC ............................. G06F 3/016; G06F 3/0416
See application file for complete search history.

(56) References Cited

U.S. PATENT DOCUMENTS 6,429,846 B2 *   8/2002   Rosenberg .............. G06F 3/011
                                                              345/173
8,780,053 B2 *   7/2014   Colgate ................. G06F 3/0421
                                                              345/173
(Continued)

FOREIGN PATENT DOCUMENTS

CN          1678978 A      10/2005
CN       209327980 U       8/2019
(Continued)

*Primary Examiner* — Sejoon Ahn
(74) *Attorney, Agent, or Firm* — WHDA, LLP

(57)                ABSTRACT

A haptic feedback module and a haptic feedback device relate to the technical field of electronics. The haptic feedback module includes: a touch control module having a touch control face; a bottom plate disposed on one side of the touch control module facing away from the touch control face; and an actuator disposed between the touch control module and the bottom plate, wherein the actuator is connected to the touch control module through a first supporting portion, the actuator is connected to the bottom plate through a second supporting portion, and the actuator is used for driving the touch control module to vibrate in response to a driving signal, so as to form haptic feedback on the touch control face.

16 Claims, 8 Drawing Sheets

(56) References Cited

U.S. PATENT DOCUMENTS

| | | | | |
|---|---|---|---|---|
| 8,884,747 B2 * | 11/2014 | Woo | ...................... | G06F 1/1626 |
| | | | | 340/407.1 |
| 9,174,344 B2 * | 11/2015 | Nahavandi | ........... | G09B 21/003 |
| 9,373,233 B2 * | 6/2016 | Birnbaum | ............. | A63F 13/285 |
| 2001/0035854 A1 * | 11/2001 | Rosenberg | ........... | G06F 3/0338 |
| | | | | 345/156 |
| 2006/0109256 A1 * | 5/2006 | Grant | ...................... | G06F 3/041 |
| | | | | 345/173 |
| 2015/0185848 A1 * | 7/2015 | Levesque | ........... | G06F 3/03547 |
| | | | | 345/173 |

FOREIGN PATENT DOCUMENTS

| | | | |
|---|---|---|---|
| CN | 211604090 | U | 9/2020 |
| CN | 213399542 | U | 6/2021 |
| CN | 116820240 | A | 9/2023 |
| FR | 3039671 | B1 | 12/2019 |

* cited by examiner

| Test position | Acceleration value (g) | Average value (g) | Relative deviation |
|---------------|------------------------|-------------------|--------------------|
| P1 | 3.55 | | |
| P2 | 3.56 | 3.59 | <1.5% |
| P3 | 3.63 | | |
| P4 | 3.62 | | |

HAPTIC FEEDBACK MODULE AND HAPTIC FEEDBACK DEVICE

CROSS-REFERENCE TO RELATED APPLICATION

The present disclosure claims the priority of the Chinese patent application filed on Jun. 29, 2023 before the CNIPA, China National Intellectual Property Administration with the application number of 202310786427.8 and the title of "HAPTIC FEEDBACK MODULE AND HAPTIC FEEDBACK DEVICE", which is incorporated herein in its entirety by reference.

TECHNICAL FIELD

The present disclosure relates to the technical field of electronics, and more particularly relates to a haptic feedback module and a haptic feedback device.

BACKGROUND

Haptic feedback is a frontier technology in the field of virtual reality and human-computer interaction, and multimedia terminals such as smartphones and tablet computers applying the haptic feedback technology have broad application prospects in the fields of education, entertainment, medical treatment, and the like. With the vigorous development of new energy automobiles, vehicle-mounted large display screens have become a trend, and more and more interactive components such as physical keys and knobs have been implemented on touch display screens.

SUMMARY

The present disclosure provides a haptic feedback module, including:

a touch control module having a touch control face;

a bottom plate disposed on one side of the touch control module facing away from the touch control face; and an actuator disposed between the touch control module and the bottom plate, wherein the actuator is connected to the touch control module through a first supporting portion, the actuator is connected to the bottom plate through a second supporting portion, and the actuator is used for driving the touch control module to vibrate in response to a driving signal, so as to form haptic feedback on the touch control face.

In some embodiments, the actuator includes a first surface and a second surface, the first supporting portion is connected to the first surface, and the second supporting portion is connected to the second surface; and the first surface and the second surface are disposed opposite to each other in a first direction, and the first direction is parallel to the touch control face.

In some embodiments, the first supporting portion includes a first supporting face and a second supporting face which are cross-connected to each other, the first supporting face is parallel to the touch control face, the second supporting face is located on one side of the first supporting face away from the touch control module, the first supporting face is connected to the touch control module, and the second supporting face is connected to the first surface.

In some embodiments, the second supporting portion includes a third supporting face and a fourth supporting face which are cross-connected to each other, the third supporting face is parallel to the bottom plate, the fourth supporting face is located on one side of the third supporting face away from the bottom plate, the third supporting face is connected to the bottom plate, and the fourth supporting face is connected to the second surface.

In some embodiments, the entire first surface is in contact connection with the second supporting face, and the entire second surface is in contact connection with the fourth supporting face.

In some embodiments, in a normal direction of the touch control face, a size of the second supporting face is greater than a size of the actuator, and a size of the fourth supporting face is greater than the size of the actuator.

In some embodiments, in the normal direction of the touch control face, the first surface is connected to a part of the second supporting face away from the touch control module, and the second surface is connected to a part of the fourth supporting face close to the touch control module.

In some embodiments, a shape of the first supporting face includes at least one of: a polygonal shape, a circular shape, an elliptical shape, a fan shape, an annular shape, and an irregular pattern; and a shape of the third supporting face includes at least one of: the polygonal shape, the circular shape, the elliptical shape, the fan shape, the annular shape, and the irregular pattern.

In some embodiments, the first supporting portion includes a first supporting plate, the first supporting face is a surface of the first supporting plate close to the touch control module, a width of the first supporting plate is greater than or equal to a thickness of the first supporting plate, the width of the first supporting plate is a size of the first supporting plate in a direction parallel to the touch control face, and the thickness of the first supporting plate is a size of the first supporting plate in a direction perpendicular to the touch control face; and the second supporting portion includes a second supporting plate, the third supporting face is a surface of the second supporting plate close to the bottom plate, a width of the second supporting plate is greater than or equal to a thickness of the second supporting plate, the width of the second supporting plate is a size of the second supporting plate in the direction parallel to the touch control face, and the thickness of the second supporting plate is a size of the second supporting plate in the direction perpendicular to the touch control face.

In some embodiments, in a second direction, the first surface is connected to a middle area of the second supporting face, the second surface is connected to a middle area of the fourth supporting face, an edge area of the second supporting face is connected to an edge area of the fourth supporting face through a rigid connector, and the second direction is parallel to the touch control face and perpendicular to the first direction.

In some embodiments, the haptic feedback module includes a first actuation group and a second actuation group, the first actuation group and the second actuation group include a same quantity of actuators, and the first actuation group and the second actuation group are disposed symmetrically.

In some embodiments, an orthographic projection of the first actuation group on the touch control face is disposed close to a first edge of the touch control face, an orthographic projection of the second actuation group on the touch control face is disposed close to a second edge of the touch control face, and the first edge and the second edge are disposed opposite to each other.

In some embodiments, the orthographic projection of the first actuation group on the touch control face is disposed close to a center of the first edge, and the orthographic projection of the second actuation group on the touch control face is disposed close to a center of the second edge.

In some embodiments, the actuators include piezoelectric patches, the piezoelectric patches of the actuators located in the first actuation group are parallel to the first edge, and the piezoelectric patches of the actuators located in the second actuation group are parallel to the second edge.

In some embodiments, the actuators include a first actuator, and an orthographic projection of the first actuator on the touch control face is disposed close to an edge of the touch control face.

In some embodiments, the first supporting portion connected to the first actuator is located on one side of the second supporting portion close to the edge.

In some embodiments, a shape of the touch control face is a quadrilateral shape, the actuators include a second actuator, the second actuator includes a piezoelectric patch, and an included angle between an orthographic projection of the piezoelectric patch in the second actuator on the touch control face and one side edge of the quadrilateral shape is greater than or equal to 10° and less than or equal to 80°.

In some embodiments, an orthographic projection of the second actuator on the touch control face is disposed close to a geometric center of the touch control face.

In some embodiments, further including:

a supporting pillar located between the touch control module and the bottom plate, wherein one end of the supporting pillar is connected to the touch control module, and the other end of the supporting pillar is connected to the bottom plate.

In some embodiments, a host material of the supporting pillar is a rigid material, the supporting pillar is in flexible connection with the touch control module, and the supporting pillar is in rigid connection with a bottom plate bracket; or the host material of the supporting pillar is a flexible material, the supporting pillar is in adhesive connection with the touch control module, and the supporting pillar is in adhesive connection with the bottom plate bracket.

In some embodiments, the touch control face is in a polygonal shape, and orthographic projections of a plurality of supporting pillars on the touch control face are respectively disposed close to different interior angles of the polygonal shape.

In some embodiments, a shape of an orthographic projection of the supporting pillar on the touch control face includes at least one of: a circular shape, an elliptical shape, a polygonal shape, a fan shape, an annular shape, and an irregular pattern.

In some embodiments, the first supporting portion is in rigid connection with the actuator, the first supporting portion is in rigid connection with the touch control module, and the second supporting portion is in flexible or rigid connection with the bottom plate.

In some embodiments, a shape of a longitudinal cross section of the first supporting portion includes at least one of: an H shape, a Z shape, a box radical shape, an I shape, an L shape, a T shape, a cylindrical shape, and a rectangular shape, and the longitudinal cross section of the first supporting portion is perpendicular to the touch control face; and/or a shape of a longitudinal cross section of the second supporting portion includes at least one of: the H shape, the Z shape, the box radical shape, the I shape, the L shape, the T shape, the cylindrical shape, and the rectangular shape, and the longitudinal cross section of the second supporting portion is perpendicular to the touch control face.

In some embodiments, the actuator includes at least one of: a lead zirconate titanate (PZT) piezoelectric thin film, monolithic piezoelectric ceramic, stacked piezoelectric ceramic, cymbal-shaped piezoelectric ceramic, a monolithic polyvinylidene fluoride film, a stacked polyvinylidene fluoride film, and a cymbal-shaped polyvinylidene fluoride film.

The present disclosure provides a haptic feedback module, including:

a touch control module having a touch control face;

a bottom plate disposed on one side of the touch control module facing away from the touch control face; and a supporting portion and an actuator, wherein the supporting portion is used for fixing the actuator between the touch control module and the bottom plate, and the actuator is used for driving the touch control module to vibrate in response to a driving signal, so as to form haptic feedback on the touch control face;

wherein the supporting portion is in rigid connection with the actuator, the actuator is in rigid connection with the touch control module, and the supporting portion is in rigid or flexible connection with the bottom plate.

In some embodiments, the actuator includes a first surface and a second surface which are disposed opposite to each other in a first direction, the first direction is parallel to the touch control face, and the supporting portion includes:

a first supporting portion connected between the first surface and the touch control module; and a second supporting portion connected between the second surface and the bottom plate.

The present disclosure provides a haptic feedback module, including:

a touch control module having a touch control face;

a bottom plate disposed on one side of the touch control module facing away from the touch control face;

an actuator located between the touch control module and the bottom plate, wherein the actuator is used for driving the touch control module to vibrate in response to a driving signal, so as to form haptic feedback on the touch control face; and a supporting pillar located between the touch control module and the bottom plate;

wherein a host material of the supporting pillar is a rigid material, one end of the supporting pillar is in flexible connection with the touch control module, and the other end of the supporting pillar is in rigid connection with a bottom plate bracket.

The present disclosure provides a haptic feedback device, including:

the haptic feedback module according to any one of embodiments, wherein the touch control module includes at least one of: a touch control circuit, a display panel, and a backlight module; and a driving component respectively connected to the touch control module and the actuator, and used for driving the display panel to display an image, and outputting a driving signal to the actuator according to touch control information of a touch control body on the touch control module, so that the actuator drives the touch control module to vibrate in response to the driving signal, so as to form haptic feedback on the touch control face, wherein the touch control information includes at least one of: a touch control position, a touch control time, and a touch control action.

The above description is only an overview of the technical solution of the present disclosure. In order to have a clearer understanding of the technical means of the present disclosure, it can be implemented according to the content of the specification. In order to make the above and other purposes, features, and advantages of the present disclosure more obvious and understandable, the specific embodiments of the present disclosure are listed below.

BRIEF DESCRIPTION OF THE DRAWINGS

In order to provide a clearer explanation of the technical solutions in the embodiments of the present disclosure or in the related art, a brief introduction will be given to the accompanying drawings required for the description of the embodiments or related art. It is obvious that the accompanying drawings in the following description are some embodiments of the present disclosure. For those skilled in the art, other drawings can be obtained based on these drawings without creative work. It should be noted that the scale in the accompanying drawings is only for illustration and does not represent the actual scale.

DETAILED DESCRIPTION OF THE EMBODIMENTS

In order to clarify the purpose, technical solution, and advantages of the embodiments of the present disclosure, a clear and complete description of the technical solution in the embodiments of the present disclosure will be provided below in conjunction with the accompanying drawings. Obviously, the described embodiments are a part of the embodiments of the present disclosure, not all of the embodiments. Based on the embodiments of the present disclosure, all other embodiments obtained by persons skilled in the art without creative work are within the scope of protection of the present disclosure.

Figure 2:
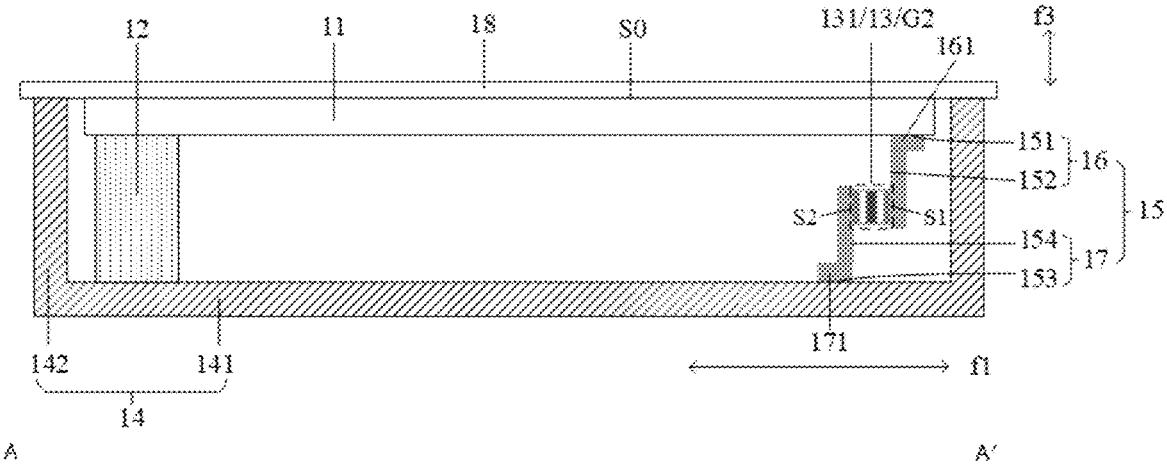
FIG. 2 illustratively shows a schematic diagram of a cross-sectional structure of a haptic feedback module along AA'.
Figure 6:
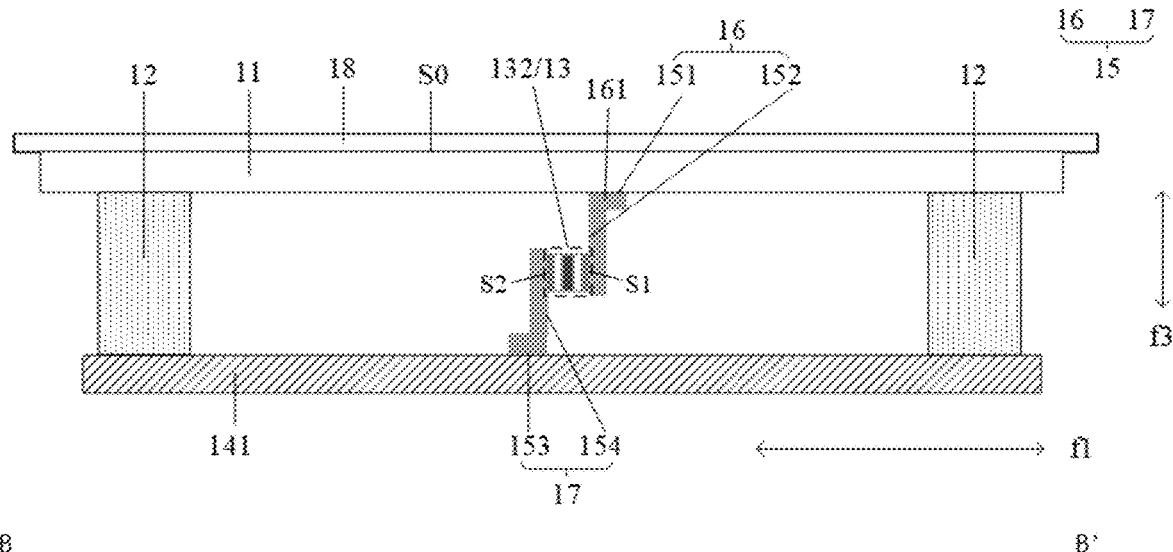
FIG. 6 illustratively shows a schematic diagram of a cross-sectional structure of a haptic feedback module along BB'.
Figure 9:
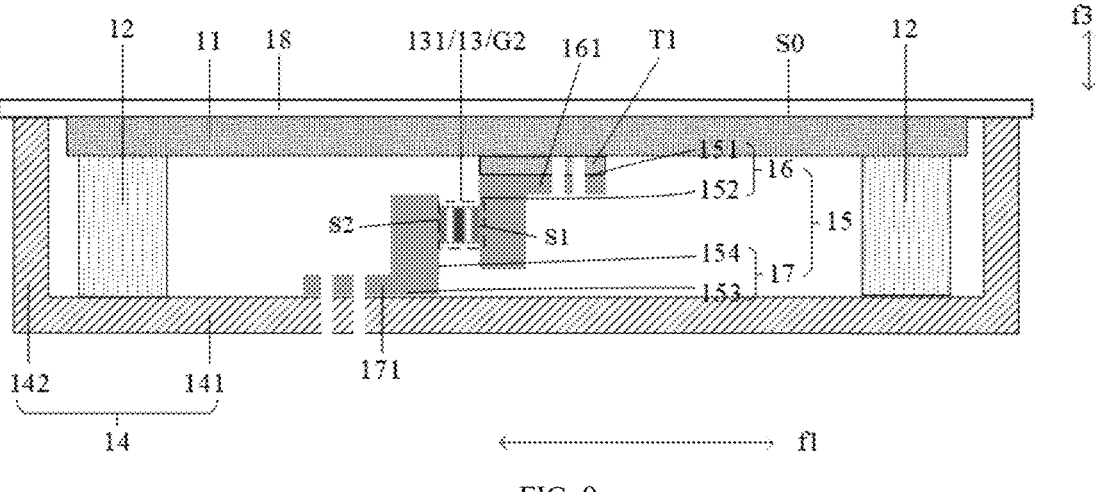
FIG. 9 illustratively shows a schematic diagram of a cross-sectional structure of the fifth type of haptic feedback module.

The present disclosure provides a haptic feedback module. As shown in FIG. 2, FIG. 6 or FIG. 9, the haptic feedback module includes: a touch control module 11 having a touch control face S0; a bottom plate 141 disposed on one side of the touch control module 11 facing away from the touch control face S0; and an actuator 13 disposed between the touch control module 11 and the bottom plate 141, wherein the actuator 13 is connected to the touch control module 11 through a first supporting portion 16, the actuator 13 is connected to the bottom plate 141 through a second supporting portion 17, and the actuator 13 is used for driving the touch control module 11 to vibrate in response to a driving signal, so as to form haptic feedback on the touch control face S0.

Among them, the first supporting portion 16 has the functions of fixing the touch control module 11 and the actuator 13, and conducting the vibration of the actuator 13 to the touch control module 11. The second supporting portion 17 has the function of fixedly supporting the actuator 13 to the bottom plate 141.

The haptic feedback module provided in the present disclosure adopts the first supporting portion 16 and the second supporting portion 17 which are designed separately for fixing the actuator 13 between the touch control module 11 and the bottom plate 141, thereby improving the stability and reliability of the actuator 13, being conducive to the fixation of a display module with a relatively large mass, and achieving human-computer interaction on a vehicle-mounted touchscreen display screen. In addition, the actuator 13 is disposed on one side of the touch control module 11 facing away from the touch control face S0, thereby being conducive to achieving a narrow bezel.

The haptic feedback module provided in the present disclosure may be applied in a vehicle-mounted display system and provide a user with real-time haptic feedback based on touch control information, and the like, thereby being of important significance and value for improving driving safety and human-computer interaction effectiveness, enriching interaction experience, and the like.

Illustratively, the touch control module 11 may include one or more of a touch control circuit, a display panel, a backlight module, and the like, which is not limited in the present disclosure.

Figure 1:
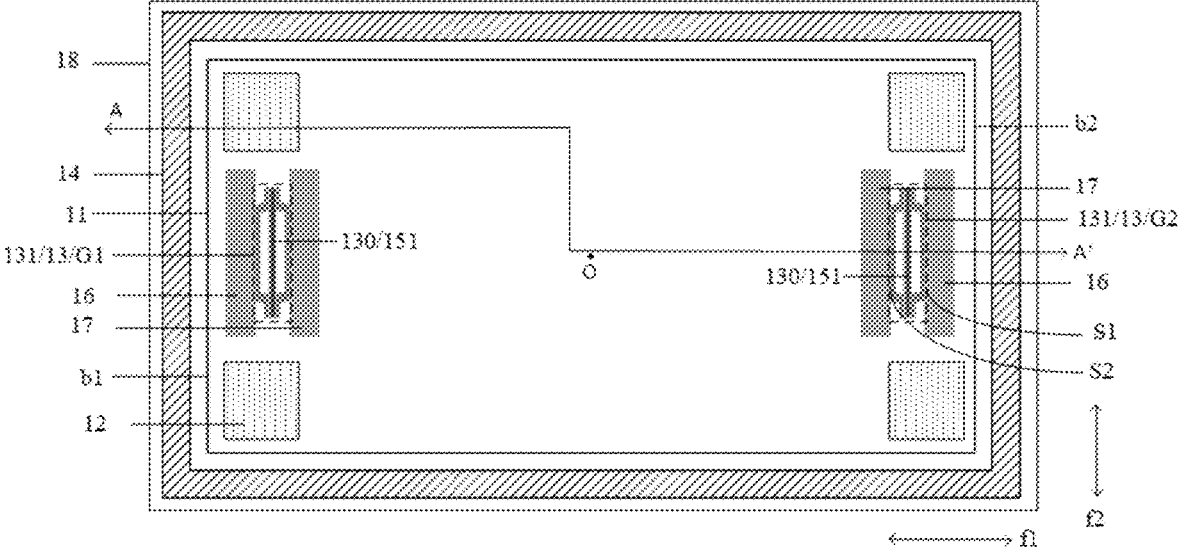
FIG. 1 illustratively shows a schematic diagram of a planar structure of a first type of haptic feedback module.
Figure 3:
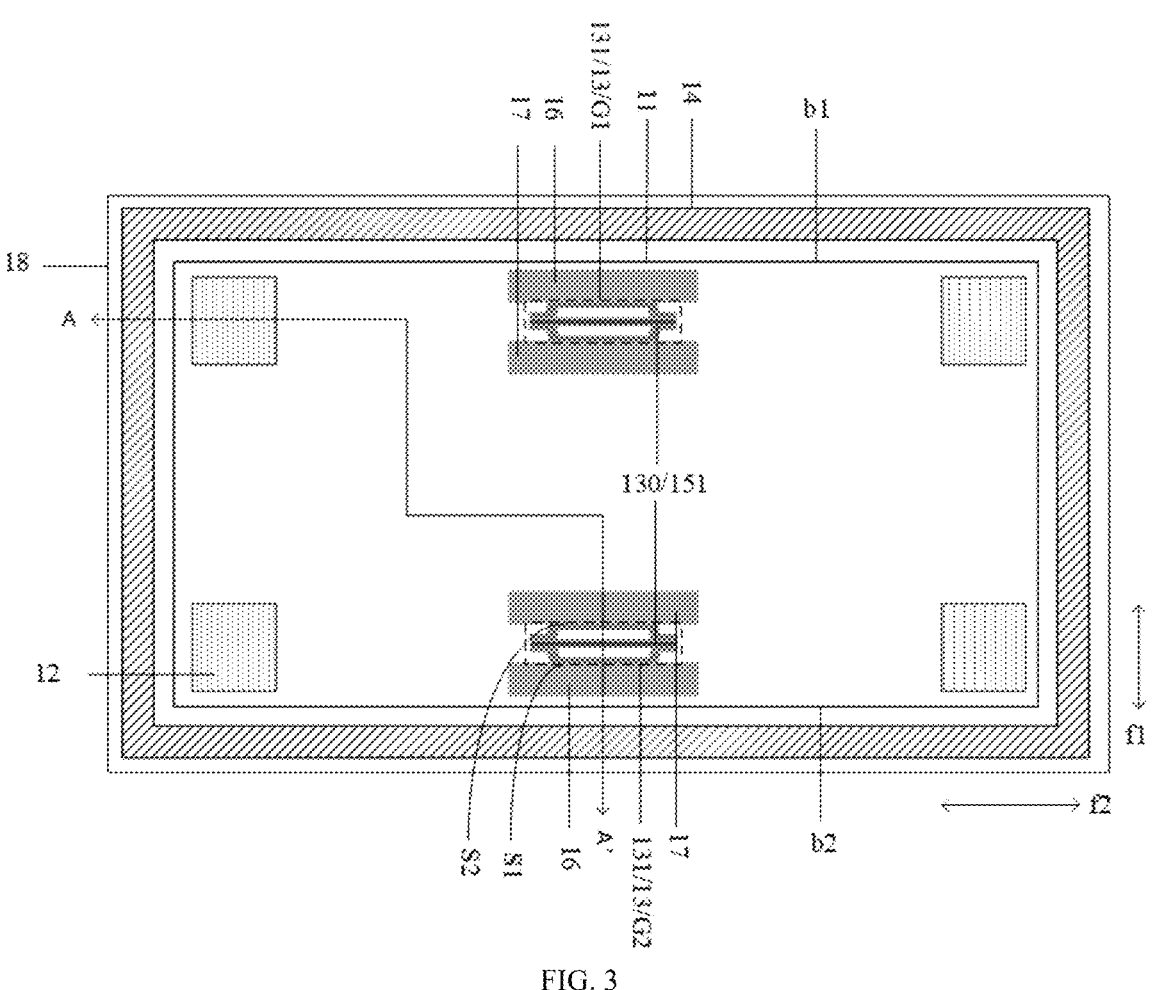
FIG. 3 illustratively shows a schematic diagram of a planar structure of a second type of haptic feedback module.
Figure 4:
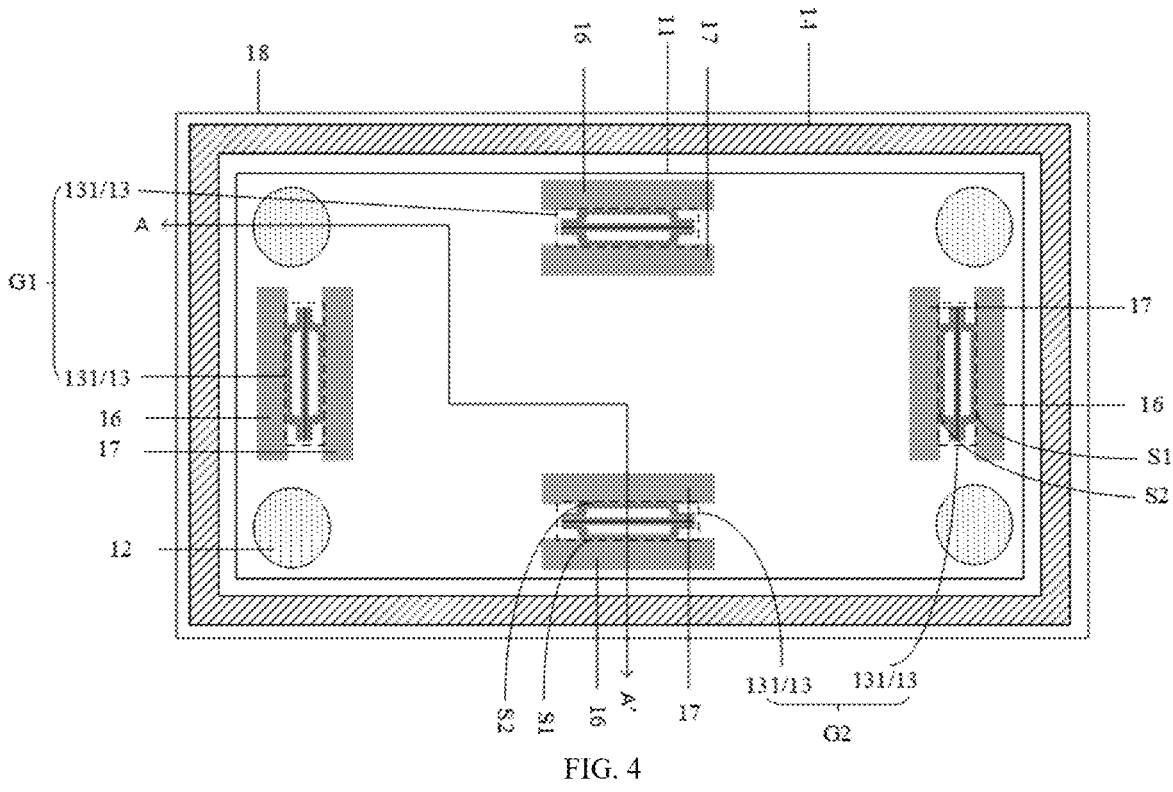
FIG. 4 illustratively shows a schematic diagram of a planar structure of a third type of haptic feedback module.
Figure 5:
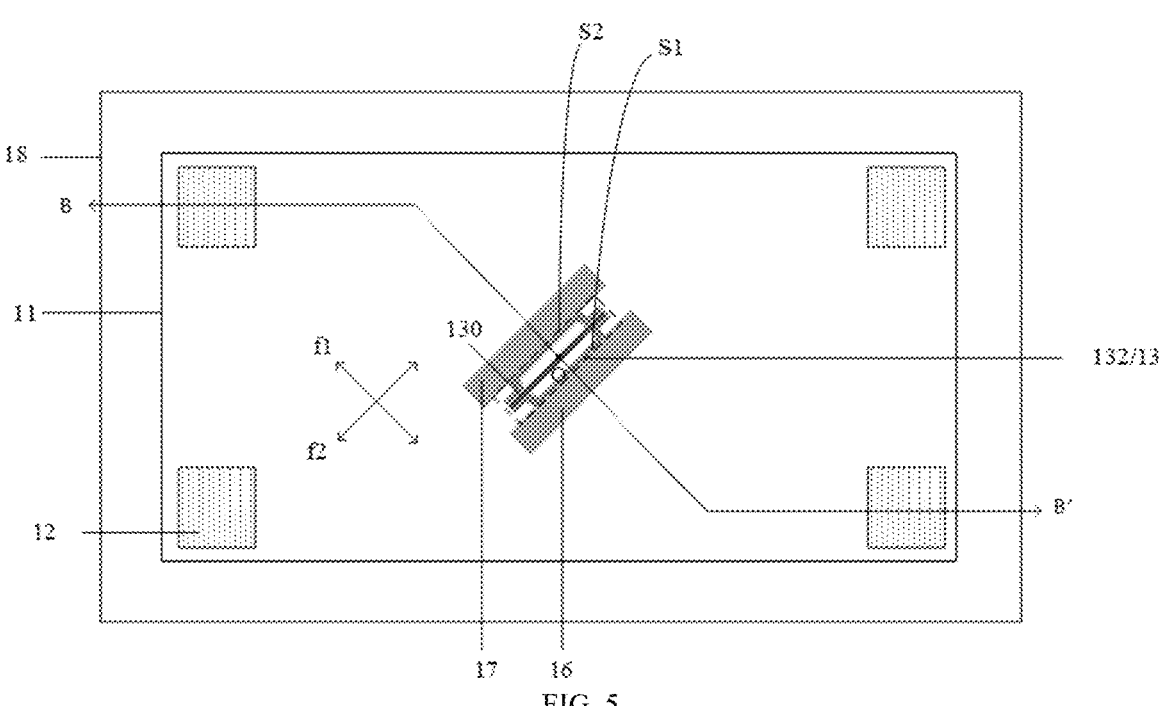
FIG. 5 illustratively shows a schematic diagram of a planar structure of a fourth type of haptic feedback module.
Figure 8:
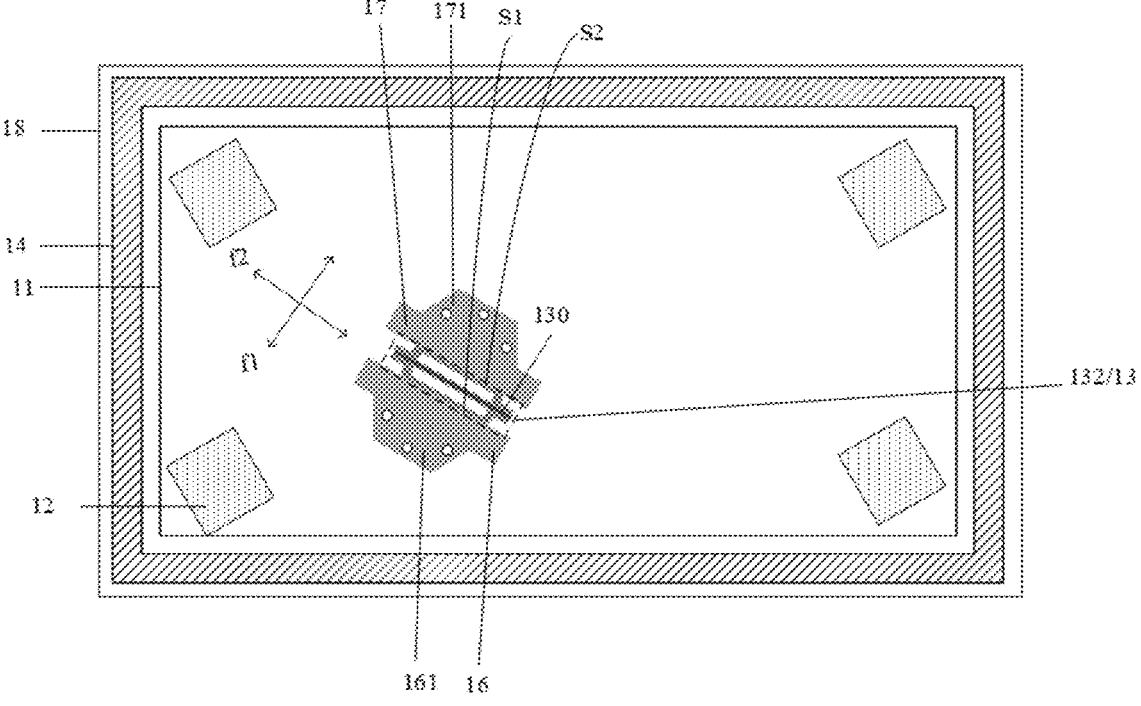
FIG. 8 illustratively shows a schematic diagram of a planar structure of a fifth type of haptic feedback module.

It should be noted that FIG. 1, FIG. 3 to FIG. 5, and FIG. 8 illustratively show schematic diagrams of planar structures of embodiments of a plurality of types of haptic feedback modules, FIG. 2 is a schematic diagram of a cross-sectional structure of the haptic feedback module shown in FIG. 1, FIG. 3 or FIG. 4 along a position AA', FIG. 6 is a schematic diagram of a cross-sectional structure of the haptic feedback module shown in FIG. 5 along a position BB', and FIG. 9 is a schematic diagram of a cross-sectional structure of the haptic feedback module shown in FIG. 8.

Figure 14:
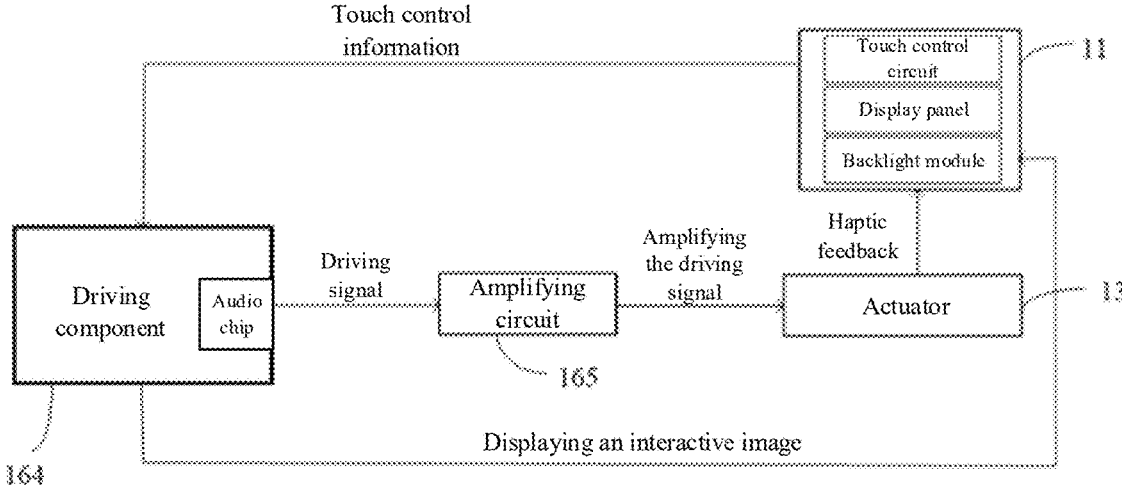
FIG. 14 illustratively shows a schematic diagram of a connecting structure of a haptic feedback device.

Illustratively, as shown in FIG. 14, a driving component 164 of the haptic feedback module may generate a driving signal according to touch control information of a touch control body on the touch control module 11 and output the driving signal to the actuator 13, and the actuator 13 drives the touch control module 11 to vibrate in response to the driving signal, so as to form haptic feedback on the touch control face S0. Among them, the touch control information includes at least one of: a touch control position, a touch control time, and a touch control action. The touch control body may be an object such as a finger or a stylus.

In some embodiments, as shown in any one of FIG. 1 to FIG. 6, the actuator 13 includes a first surface S1 and a second surface S2, wherein the first supporting portion 16 is connected to the first surface S1, the second supporting portion 17 is connected to the second surface S2, and the first surface S1 and the second surface S2 are disposed opposite to each other.

In this embodiment, the first surface S1 and the second surface S2 which are disposed opposite to each other are respectively connected to the touch control module 11 and the bottom plate 141 through different supporting portions, namely, the first supporting portion 16 and the second supporting portion 17, so that the steadiness of the actuator 13 may be improved.

In some embodiments, as shown in any one of FIG. 1 to FIG. 6, the first surface S1 and the second surface S2 are disposed opposite to each other in a first direction f1, and the first direction f1 is parallel to the touch control face S0, thereby being conducive to the actuator 13 driving the touch control module 11 to generate vibration in a direction parallel to the touch control face S0 (namely, a horizontal direction).

Among them, the first surface S1 and the second surface S2 are perpendicular to the first direction f1.

In some embodiments, as shown in FIG. 2, FIG. 6 or FIG. 9, the first supporting portion 16 includes a first supporting face 151 and a second supporting face 152 which are cross-connected to each other, the first supporting face 151 is parallel to the touch control face S0, the second supporting face 152 is located on one side of the first supporting face 151 away from the touch control module 11, the first supporting face 151 is connected to the touch control module 11, and the second supporting face 152 is connected to the first surface S1.

Illustratively, as shown in FIG. 2, FIG. 6 or FIG. 9, the first supporting face 151 and the second supporting face 152 are perpendicular to each other. The first supporting face 151 and the second supporting face 152 may be of an integral structure and of the same material. In this way, the first supporting portion 16 may be integrally molded, thereby simplifying the machining and mounting procedures.

In some embodiments, as shown in FIG. 2, FIG. 6 or FIG. 9, the second supporting portion 17 includes a third supporting face 153 and a fourth supporting face 154 which are cross-connected to each other, the third supporting face 153 and the bottom plate 141 are parallel to each other, the fourth supporting face 154 is located on one side of the third supporting face 153 away from the bottom plate 141, the third supporting face 153 is connected to the bottom plate 141, and the fourth supporting face 154 is connected to the second surface S2.

Illustratively, as shown in FIG. 2, FIG. 6 or FIG. 9, the third supporting face 153 and the fourth supporting face 154 are perpendicular to each other. The third supporting face 153 and the fourth supporting face 154 may be of an integral structure and of the same material. In this way, the second supporting portion 17 may be integrally molded, thereby simplifying the machining and mounting procedures.

In some embodiments, as shown in FIG. 2, FIG. 6 or FIG. 9, the entire first surface S1 is in contact connection with the second supporting face 152, thereby ensuring that the vibration of the actuator 13 is conducted to the touch control module 11 almost without attenuation, and reducing the attenuation of the vibration at a connecting position.

In some embodiments, as shown in FIG. 2, FIG. 6 or FIG. 9, the entire second surface S2 is in contact connection with the fourth supporting face 154, thereby being conducive to increasing the amplitude of the actuator 13 in a principal vibration direction while reducing vibration components in other directions.

In order to avoid direct contact between the actuator 13 and the touch control module 11, in some embodiments, as shown in FIG. 2, FIG. 6 or FIG. 9, in a normal direction f3 of the touch control face S0, a size of the second supporting face 152 is greater than a size of the actuator 13, thereby ensuring that the vibration generated by the actuator 13 is almost all conducted to the touch control module 11 through a path, namely, the first supporting portion 16, thereby avoiding the dispersion of the vibration.

Further, as shown in FIG. 2, FIG. 6 or FIG. 9, in the normal direction f3 of the touch control face S0, the first surface S1 is connected to a part of the second supporting face 152 away from the touch control module 11.

In order to avoid the vibration attenuation caused by direct contact between the actuator 13 and the bottom plate 141, in some embodiments, as shown in FIG. 2, FIG. 6 or FIG. 9, in the normal direction f3 of the touch control face S0, a size of the fourth supporting face 154 is greater than the size of the actuator 13.

Further, as shown in FIG. 2, FIG. 6 or FIG. 9, in the normal direction f3 of the touch control face S0, the second surface S2 is connected to a part of the fourth supporting face 154 close to the touch control module 11.

Figure 7:
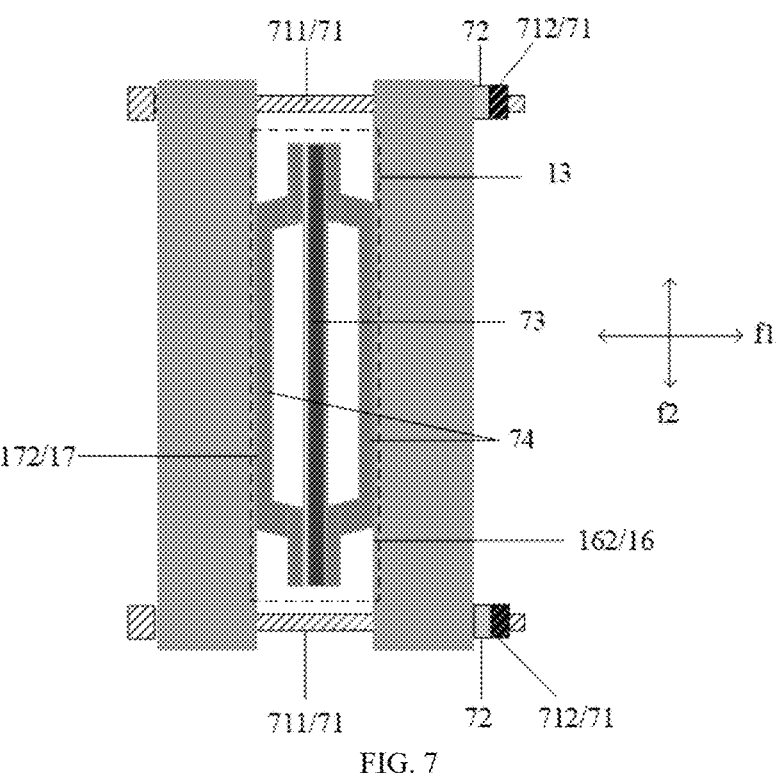
FIG. 7 illustratively shows a schematic diagram of a cross-sectional structure of an actuator.

In some embodiments, as shown in FIG. 7, in a second direction f2, the size of the second supporting face 152 is greater than a size of the first surface S1, the size of the fourth supporting face 154 is greater than a size of the second surface S2, and the second direction f2 is parallel to the touch control face S0 and perpendicular to the first direction f1.

In some embodiments, as shown in FIG. 7, in the second direction f2, the first surface S1 is connected to a middle area of the second supporting face 152, the second surface S2 is connected to a middle area of the fourth supporting face 154, and an edge area of the second supporting face 152 is connected to an edge area of the fourth supporting face 154 through a rigid connector 71, wherein the rigid connector 71 is substantially parallel to the touch control face S0 or the first direction f1.

By connecting the first supporting portion 16 to the second supporting portion 17 by the rigid connector 71, the vibration generated by the touch control module 11 driven by the actuator 13 in the normal direction f3 of the touch control face S0 may be weakened, thereby being conducive to enhancing the vibration generated by the touch control module 11 driven by the actuator 13 in a direction parallel to the touch control face S0.

In an embodiment, one or more rigid connectors 71 may be disposed in the haptic feedback module for connecting edge areas of the second supporting face 152 and the fourth supporting face 154 which are disposed opposite to each other. Illustratively, in FIG. 7, two rigid connectors 71 are disposed in the haptic feedback module, and the two rigid connectors 71 are located on two sides of the actuator 13. In this way, the vibration generated by the touch control module 11 driven by the actuator 13 in the normal direction f3 of the touch control face S0 may be further weakened, and the vibration generated by the touch control module 11 driven by the actuator 13 in the direction parallel to the touch control face S0 may be further enhanced.

Illustratively, as shown in FIG. 7, the rigid connector 71 may include, for example, a screw 711 and a nut 712, wherein the screw 711 sequentially passes through through-holes in the second supporting face 152 and the fourth supporting face 154, to be connected to the nut 712.

In order to prevent the rigid connector 71 from limiting the vibration of the touch control module 11 in the horizontal direction (such as the direction parallel to the touch control face S0), an elastic gasket 72 may be disposed between the rigid connector 71 and the first supporting portion 16, wherein the elastic gasket 72 is made of a material capable of generating elastic deformation, such as a rubber ring.

Illustratively, as shown in FIG. 7, the elastic gasket 72 is disposed on the screw 711 in a penetrating way and located between the first supporting portion 16 and the nut 712.

In some embodiments, a shape of the first supporting face 151 includes at least one of: regular patterns such as a polygonal shape, a circular shape, an elliptical shape, a fan shape and an annular shape, and an irregular pattern, wherein the polygonal shape includes a non-chamfered polygonal shape or a chamfered polygonal shape.

Illustratively, as shown in FIG. 1, and FIG. 3 to FIG. 5, the first supporting face 151 is in a rectangular shape. As shown in FIG. 8, the first supporting face 151 is in a trapezoidal shape.

In some embodiments, a shape of the third supporting face 153 includes at least one of: the polygonal shape, the circular shape, the elliptical shape, the fan shape, the annular shape, and the irregular pattern, wherein the polygonal shape includes the non-chamfered polygonal shape or the chamfered polygonal shape.

Illustratively, as shown in FIG. 1, and FIG. 3 to FIG. 5, the third supporting face 153 is in the rectangular shape. As shown in FIG. 8, the third supporting face 153 is in the trapezoidal shape.

In some embodiments, as shown in FIG. 2, FIG. 6 and FIG. 9, the first supporting portion 16 includes a first supporting plate 161, wherein the first supporting face 151 is a surface of the first supporting plate 161 close to the touch control module 11, and a width of the first supporting plate 161 is greater than or equal to a thickness of the first supporting plate 161. The width of the first supporting plate 161 is a size of the first supporting plate 161 in a direction parallel to the touch control face S0, and the thickness of the first supporting plate 161 is a size of the first supporting plate 161 in a direction perpendicular to the touch control face S0. In this way, a vibration contact face between the first supporting portion 16 and the touch control module 11 may be increased, the mechanical stability of the haptic feedback module may also be improved, and a thickness of the haptic feedback module may be reduced.

In some embodiments, as shown in FIG. 2, FIG. 6 and FIG. 9, the second supporting portion 17 includes a second supporting plate 171, wherein the third supporting face 153 is a surface of the second supporting plate 171 close to the bottom plate 141, a width of the second supporting plate 171 is greater than or equal to a thickness of the second supporting plate 171, the width of the second supporting plate 171 is a size of the second supporting plate 171 in the direction parallel to the touch control face S0, and the thickness of the second supporting plate 171 is a size of the second supporting plate 171 in the direction perpendicular to the touch control face S0. In this way, a contact area between the second supporting portion 17 and the bottom plate 141 may be increased, the mechanical stability of the haptic feedback module may be improved, and the thickness of the haptic feedback module may be reduced.

Illustratively, the actuator 13 is a device operating by utilizing an inverse piezoelectric effect of a piezoelectric material. An inverse effect of a "positive piezoelectric effect", namely, the elastic deformation of a dielectric medium driven by an electrical signal, is called the "inverse piezoelectric effect".

In some embodiments, the actuator 13 includes at least one of: a lead zirconate titanate (PZT) piezoelectric thin film, monolithic piezoelectric ceramic, stacked piezoelectric ceramic, cymbal-shaped piezoelectric ceramic (as shown in FIG. 1 to FIG. 7), a monolithic polyvinylidene fluoride film, a stacked polyvinylidene fluoride film, a cymbal-shaped polyvinylidene fluoride film, and the like.

Compared with a monolithic structure, the actuators of a stacked structure and a cymbal-shaped structure have the features of low-voltage driving, stronger vibration sense and larger displacement, and are more suitable for achieving the haptic feedback effect on large-size and heavy-mass haptic feedback modules.

The actuator 13 in FIG. 7 is of a cymbal-shaped piezoelectric ceramic structure, and as shown in FIG. 7, the actuator 13 of the cymbal-shaped piezoelectric ceramic structure includes: a piezoelectric ceramic patch 73 located at a middle position, and hinge structures 74 disposed on two sides of the piezoelectric ceramic patch 73, wherein the hinge structures 74 are connected to an edge of the piezoelectric ceramic patch 73, and gaps are provided between a middle area of the piezoelectric ceramic patch 73 and the hinge structures 74. Among them, surfaces of the hinge structures 74 facing away from the piezoelectric ceramic patch 73 are the first surface S1 or the second surface S2.

In some embodiments, the first supporting portion 16 is in rigid connection with the actuator 13, and the first supporting portion 16 is in rigid connection with the touch control module 11, thereby ensuring that the actuator 13 can drive the touch control module 11 to vibrate together without causing too much vibration attenuation at a connecting position.

In some embodiments, the second supporting portion 17 is in flexible connection with the bottom plate 141. By flexibly connecting the second supporting portion 17 to the bottom plate 141, excited vibration of the bottom plate 141 may be avoided.

Since the touch control module 11 for vehicle-mounted display has the features of large size, high rigidity and large mass, in order to improve the mechanical stability of the haptic feedback module for vehicle-mounted display, in some embodiments, the second supporting portion 17 is in rigid connection with the bottom plate 141. The second supporting portion 17 is rigidly connected to the bottom plate 141, thereby being conducive to increasing a vibration amplitude of the touch control module 11.

Among them, the second supporting portion 17 may be in rigid connection or flexible connection with the second surface S2, which is not limited in the present disclosure.

Illustratively, for the rigid connection, adhesive connection may be performed by a hard adhesive such as an epoxy adhesive, connection may also be performed by a metal welding mode, connection may also be performed by a rigid connector such as a screw, and the like.

Illustratively, as shown in FIG. 8 and FIG. 9, the first supporting plate 161 of the first supporting portion 16 is provided with a threaded hole, a surface of the touch control module 11 facing away from the touch control face S0 is also correspondingly provided with a threaded hole, and rigid connection between the first supporting portion 16 and the touch control module 11 may be achieved by screwing a screw. Among them, penetration directions of the threaded holes are perpendicular to the touch control face S0, and a quantity of the threaded holes may be one, two, three (as shown in FIG. 8) or more. As shown in FIG. 9, the surface of the touch control module 11 facing away from the touch control face S0 may have a lug boss T1, and the threaded holes are formed in the lug boss T1.

Illustratively, as shown in FIG. 8 and FIG. 9, the second supporting plate 171 of the second supporting portion 17 is provided with a threaded hole, a surface of the bottom plate 141 close to the touch control module 11 is also correspondingly provided with a threaded hole, and rigid connection between the second supporting portion 17 and the bottom plate 141 may be achieved by screwing a screw, wherein penetration directions of the threaded holes are perpendicular to the touch control face S0, and a quantity of the threaded holes may be one, two, three (as shown in FIG. 8) or more.

Illustratively, for the flexible connection, adhesive connection may be performed by adopting a soft adhesive, for example, a flexible adhesive tape such as a double-sided adhesive tape, and a very high bond (VHB) adhesive tape (a polyacrylate double-sided foam tape), or may also be performed by adopting a liquid adhesive such as polyurethane glue, which is not limited in the present disclosure.

Illustratively, an orthographic projection of the bottom plate 141 on the touch control face S0 may cover the orthographic projection of the touch control module 11 on the touch control face S0 (as shown in FIG. 2), or the orthographic projection of the bottom plate 141 on the touch control face S0 is located within a range of the orthographic projection of the touch control module 11 on the touch control face S0 (as shown in FIG. 6).

Illustratively, as shown in FIG. 2, the haptic feedback module further includes a side plate 142, wherein the side plate 142 is located on one side of the bottom plate 141 and connected to an edge of the bottom plate 141, and an accommodating space and a window are formed by the enclosure of the bottom plate 141 and the side plate 142, the touch control module 11 is disposed in the accommodating space, and the touch control face S0 faces the window. A module outer bezel 14 is composed of the bottom plate 141 and the side plate 142.

During specific implementation, the module outer bezel 14 may also not include the side plate 142, as shown in FIG. 6.

Illustratively, as shown in FIG. 2, FIG. 6 or FIG. 9, the haptic feedback module further includes a cover plate 18, wherein the cover plate 18 is located on one side of the touch control module 11 close to the touch control face S0, and has the functions of encapsulating and protecting the touch control module 11, wherein the cover plate 18 may be reinforced glass, and the like.

Illustratively, as shown in FIG. 2, the cover plate 18 is located on one side of the side plate 142 facing away from the bottom plate 141, and flexible connection is adopted between the cover plate 18 and the side plate 142 to prevent the vibration from being conducted to the module outer bezel 14 through the cover plate 18.

In some embodiments, a modulus of elasticity of the first supporting portion 16 is greater than or equal to 10 GPa, and less than or equal to 300 GPa, such as tens of GPa. The material of the first supporting portion 16 may be selected from an aluminum alloy, a titanium alloy, tungsten steel, stainless steel, and the like, which is not limited in the present disclosure.

In some embodiments, a modulus of elasticity of the second supporting portion 17 is greater than or equal to 10 GPa, and less than or equal to 300 GPa, such as tens of GPa. The material of the second supporting portion 17 may be selected from an aluminum alloy, a titanium alloy, tungsten steel, stainless steel, and the like, which is not limited in the present disclosure.

In some embodiments, the materials of the first supporting portion 16 and the second supporting portion 17 may be the same or different.

In some embodiments, a shape of a longitudinal cross section of the first supporting portion 16 includes at least one of: an H shape, a Z shape, a box radical shape, an I shape, an L shape, a T shape, a cylindrical shape, and a rectangular shape, and the longitudinal cross section of the first supporting portion 16 is perpendicular to the touch control face S0.

In some embodiments, a shape of a longitudinal cross section of the second supporting portion 17 includes at least one of: the H shape, the Z shape, the box radical shape, the I shape, the L shape, the T shape, the cylindrical shape, and the rectangular shape, and the longitudinal cross section of the second supporting portion 17 is perpendicular to the touch control face S0.

In some embodiments, the longitudinal cross sections of the first supporting portion 16 and the second supporting portion 17 may be the same or different.

Illustratively, as shown in FIG. 2, FIG. 6 or FIG. 9, the shapes of the longitudinal cross sections of the first supporting portion 16 and the second supporting portion 17 are the same and both are L shapes.

Illustratively, the haptic feedback module may include one or more actuators 13 spaced apart from each other. As shown in FIG. 1 or FIG. 3, the haptic feedback module includes two actuators 13; as shown in FIG. 4, the haptic feedback module includes four actuators 13; and as shown in FIG. 5 or FIG. 8, the haptic feedback module includes one actuator 13.

In some embodiments, as shown in FIG. 1, FIG. 3 or FIG. 4, the haptic feedback module includes a first actuation group G1 and a second actuation group G2, wherein the first actuation group G1 and the second actuation group G2 include a same quantity of actuators 13, and the first actuation group G1 and the second actuation group G2 are symmetrically disposed.

In this embodiment, by symmetrically disposing the first actuation group G1 and the second actuation group G2, the uniformity of vibration on the touch control face S0 may be improved.

Among them, the first actuation group G1 and the second actuation group G2 may include one (as shown in FIG. 1 or FIG. 3) actuator 13, or a plurality of actuators 13 (two as shown in FIG. 4), which is not limited in the present disclosure.

Illustratively, as shown in FIG. 1 or FIG. 3, the first actuation group G1 and the second actuation group G2 are axially symmetrical, and a symmetrical axis is a perpendicular bisector of a line segment for connecting the first actuation group G1 to the second actuation group G2. In FIG. 1 and FIG. 3, the touch control face S0 is rectangular, and the symmetrical axis of the first actuation group G1 and the second actuation group G2 is a symmetrical axis of the rectangle itself.

Illustratively, as shown in FIG. 1, FIG. 3 or FIG. 4, the first actuation group G1 and the second actuation group G2 are centrally symmetrical. In FIG. 1, FIG. 3 and FIG. 4, the touch control face S0 is rectangular, and a symmetrical center of the first actuation group G1 and the second actuation group G2 is a geometric center of the rectangle.

In some embodiments, as shown in FIG. 1 or FIG. 3, an orthographic projection of the first actuation group G1 on the touch control face S0 is disposed close to a first edge b1 of the touch control face S0, an orthographic projection of the second actuation group G2 on the touch control face S0 is disposed close to a second edge b2 of the touch control face S0, and the first edge b1 and the second edge b2 are disposed opposite to each other. In this way, the uniformity of vibration on the touch control face S0 may be further improved.

Illustratively, as shown in FIG. 1 or FIG. 3, the first actuation group G1 and the second actuation group G2 are disposed to be axially symmetrical, the touch control face S0 is rectangular, and the first edge b1 and the second edge b2 are a pair of short sides (as shown in FIG. 1) or a pair of long sides (as shown in FIG. 3) of the rectangle.

In some embodiments, as shown in FIG. 1 or FIG. 3, the orthographic projection of the first actuation group G1 on the touch control face S0 is disposed close to a center of the first edge b1, and the orthographic projection of the second actuation group G2 on the touch control face S0 is disposed close to a center of the second edge b2. In this way, the uniformity of vibration on the touch control face S0 may be further improved.

Illustratively, as shown in FIG. 1, the touch control face S0 is rectangular, the orthographic projection of the first actuation group G1 on the touch control face S0 is disposed close to a center of a left edge (namely, the first edge b1) of the touch control face S0, and the orthographic projection of the second actuation group G2 on the touch control face S0 is disposed close to a center of a right edge (namely, the second edge b2) of the touch control face S0. As shown in FIG. 3, the touch control face S0 is rectangular, the orthographic projection of the first actuation group G1 on the touch control face S0 is disposed close to a center of an upper edge (namely, the first edge b1) of the touch control face S0, and the orthographic projection of the second actuation group G2 on the touch control face S0 is disposed close to a center of a lower edge (namely, the second edge b2) of the touch control face S0.

In some embodiments, as shown in FIG. 1 or FIG. 3, the actuator 13 includes a piezoelectric patch 130 (such as a piezoelectric thin film or a piezoelectric ceramic patch 73), the piezoelectric patch 130 of the actuator 13 located in the first actuation group G1 is parallel to the first edge b1, and the piezoelectric patch 130 of the actuator 13 located in the second actuation group G2 is parallel to the second edge b2.

Illustratively, as shown in FIG. 1 or FIG. 3, the first surface S1 and the second surface S2 are parallel to the piezoelectric patch 130.

Illustratively, a vibration direction of the actuator 13 may be parallel to the touch control face S0 or perpendicular to the touch control face S0, which is not limited in the present disclosure.

Illustratively, a primary vibration direction of the actuator 13 is perpendicular to a plane where the piezoelectric patch 130 is located.

In some embodiments, as shown in any one of FIG. 1 to FIG. 4, the actuator 13 includes a first actuator 131, wherein an orthographic projection of the first actuator 131 on the touch control face S0 is disposed close to an edge of the touch control face S0.

In some embodiments, as shown in any one of FIG. 1 to FIG. 4, the first supporting portion 16 connected to the first actuator 131 is located on one side of the second supporting portion 17 close to the edge. That is, for the first actuator 131, the first supporting portion 16 for conducting vibration is closer to the edge, thereby being conducive to improving the uniformity of vibration on the touch control face S0.

Illustratively, as shown in FIG. 1 or FIG. 4, for the first actuator 131 close to the left edge, the first supporting portion 16 connected to the first actuator 131 is located on one side of the second supporting portion 17 close to the left edge; and for the first actuator 131 close to the right edge, the first supporting portion 16 connected to the first actuator 131 is located on one side of the second supporting portion 17 close to the right edge. As shown in FIG. 3 or FIG. 4, for the first actuator 131 close to the upper edge, the first supporting portion 16 connected to the first actuator 131 is located on one side of the second supporting portion 17 close to the upper edge; and for the first actuator 131 close to the lower edge of the touch control face S0, the first supporting portion 16 connected to the first actuator 131 is located on one side of the second supporting portion 17 close to the lower edge.

Illustratively, as shown in FIG. 1, FIG. 3 or FIG. 4, a first surface S1 and a second surface S2 of the first actuator 131 may be parallel to the edge to which the first actuator 131 is close, and the first surface S1 is located on an outer side of the second surface S2, namely, one side close to the edge.

Illustratively, as shown in FIG. 4, the touch control face S0 is in a polygonal shape, and a plurality of first actuators 131 are respectively disposed close to different side edges of the polygonal shape. In FIG. 4, the touch control face S0 is in a quadrilateral shape, a touch control feedback module includes four first actuators 131, and each first actuator 131 is disposed close to one side edge of the quadrilateral shape.

Illustratively, one first actuator 131 (as shown in FIG. 4) or a plurality of first actuators 131 may be disposed near each side edge of the polygonal shape, which is not limited in the present disclosure.

In order to generate vibration in directions of a plurality of side edges of the touch control face S0, in some embodiments, as shown in FIG. 5 or FIG. 8, the touch control face S0 is in the quadrilateral shape, the actuator 13 includes a second actuator 132, the second actuator 132 includes a piezoelectric patch 130, and an included angle between an orthographic projection of the piezoelectric patch 130 in the second actuator 132 on the touch control face S0 and one side edge of the quadrilateral shape may be greater than or equal to 10° and less than or equal to 80°.

Further, in order to improve the uniformity of vibration on the touch control face S0, the included angle between the orthographic projection of the piezoelectric patch 130 in the second actuator 132 on the touch control face S0 and one side edge of the quadrilateral shape may be greater than or equal to 30° and less than or equal to 60°, for example, the included angle is 45°.

Illustratively, in FIG. 5 and FIG. 8, the touch control face S0 is in a rectangular shape. An included angle between the orthographic projection of the piezoelectric patch 130 in the second actuator 132 on the touch control face S0 and a long side or a short side of the rectangular shape is 45°.

It should be noted that the included angle between the orthographic projection of the piezoelectric patch 130 in the second actuator 132 on the touch control face S0 and the long side of the rectangular shape may also be 0°, namely, the piezoelectric patch 130 in the second actuator 132 is parallel to a direction of the long side; and may also be 90°, namely, the piezoelectric patch 130 in the second actuator 132 is perpendicular to the direction of the long side, and other angles are also possible, which is not limited in the present disclosure.

In some embodiments, as shown in FIG. 5 or FIG. 8, an orthographic projection of the second actuator 132 on the touch control face S0 is disposed close to a geometric center of the touch control face S0.

Illustratively, as shown in FIG. 5, the haptic feedback module includes one second actuator 132, wherein an orthographic projection of the second actuator 132 on the touch control face S0 covers the geometric center of the touch control face S0.

Illustratively, as shown in FIG. 8, the haptic feedback module includes one second actuator 132, wherein an orthographic projection of the second actuator 132 on the touch control face S0 is disposed close to and offset from the geometric center of the touch control face S0.

Illustratively, as shown in FIG. 8, a distance between a center of the orthographic projection of the second actuator 132 on the touch control face S0 and the geometric center of the touch control face S0 is less than a distance between the center of the orthographic projection of the second actuator 132 on the touch control face S0 and an edge of the touch control face S0.

Illustratively, the haptic feedback module may include a plurality of second actuators 132, wherein orthographic projections of the plurality of second actuators 132 on the touch control face S0 may symmetrically surround the geometric center of the touch control face S0.

During specific implementation, in a direction parallel to the touch control face S0, a plurality of actuators 13 may also be arranged in an array, or uniformly arranged, which is not limited in the present disclosure.

In some embodiments, as shown in any one of FIG. 1 to FIG. 6, the haptic feedback module further includes: a supporting pillar 12 located between the touch control module 11 and the bottom plate 141, wherein one end of the supporting pillar 12 is connected to the touch control module 11 and the other end of the supporting pillar 12 is connected to the bottom plate 141.

Among them, the supporting pillar 12 has the function of fixing the touch control module 11, and the supporting pillar 12 is used for forming a gap for accommodating the actuator 13 between the touch control module 11 and the bottom plate 141.

In some embodiments, a host material of the supporting pillar 12 is a rigid material, the supporting pillar 12 is in flexible connection with the touch control module 11, and the supporting pillar 12 is in rigid connection with the bottom plate 141 bracket.

In this embodiment, since the rigidity has resistance to deformation, the rigid supporting pillar 12 and rigid connection between the supporting pillar 12 and the bottom plate 141 can improve the stability of the touch control module 11. In addition, by flexibly connecting the supporting pillar 12 to the touch control module 11, a certain movement space can be ensured when the touch control module 11 is driven by the actuator 13 to vibrate, so as to avoid the attenuation of the vibration of the touch control module 11.

Illustratively, the rigid supporting pillar 12 and the bottom plate 141 may be adhered by a hard adhesive such as an epoxy adhesive, may also be connected by a metal welding mode, may also be connected by a rigid connector 71 such as a screw 711, or may also be of an integral structure. The supporting pillar 12 and the bottom plate 141 of the integral structure may be integrally molded, thereby simplifying the machining and mounting procedures.

Illustratively, the rigid supporting pillar 12 and the touch control module 11 may be adhesively fixed by adopting a soft adhesive, for example, a flexible adhesive tape such as a double-sided adhesive tape, a VHB adhesive tape (a polyacrylate double-sided foam tape), and silica gel, and a liquid adhesive such as polyurethane glue may also be adopted, which is not limited in the present disclosure.

Illustratively, a modulus of elasticity of the supporting pillar 12 is greater than or equal to 10 GPa, and less than or equal to 300 GPa, such as tens of GPa. The material of the supporting pillar 12 may be selected from an aluminum alloy, a titanium alloy, tungsten steel, stainless steel, and the like, which is not limited in the present disclosure.

In some embodiments, the host material of the supporting pillar 12 is a flexible material, the supporting pillar 12 is in adhesive connection with the touch control module 11, and the supporting pillar 12 is in adhesive connection with the bottom plate 141 bracket.

In this embodiment, since the flexible material has a property of being deformed without being damaged, the flexible supporting pillar 12 and the adhesive connection between the supporting pillar 12 and the bottom plate 141 can increase the movement space when the touch control module 11 vibrates, so as to avoid the attenuation of the vibration of the touch control module 11 control module 11 to the maximum extent.

Illustratively, a modulus of elasticity of the supporting pillar 12 is greater than or equal to 10 MPa, and less than or equal to 300 MPa, such as tens of MPa. The material of the supporting pillar 12 may be selected from the double-sided adhesive tape, the VHB adhesive tape, the silica gel or a rubber gasket, and the like, which is not limited in the present disclosure.

In order to improve the steadiness of the touch control module 11, as shown in any one of FIG. 1, FIG. 3 to FIG. 5, and FIG. 8, the haptic feedback module includes a plurality of supporting pillars 12 spaced apart from each other.

In some embodiments, as shown in any one of FIG. 1, FIG. 3 to FIG. 5, and FIG. 8, the touch control face S0 is in the polygonal shape, and orthographic projections of the plurality of supporting pillars 12 on the touch control face S0 are respectively disposed close to different interior angles of the polygon, thereby further improving the stability and reliability of the haptic feedback module.

Illustratively, as shown in any one of FIG. 1, FIG. 3 to FIG. 5, and FIG. 8, a quantity of supporting pillars 12 in the haptic feedback module is the same as a quantity of the interior angles of the polygonal shape. In FIG. 1, FIG. 3 to FIG. 5, and FIG. 8, the touch control face S0 is quadrilateral, the haptic feedback module includes four supporting pillars 12, and orthographic projections of the four supporting pillars 12 on the touch control face S0 are respectively disposed close to different interior angles.

In some embodiments, as shown in any one of FIG. 1, FIG. 3 to FIG. 5, and FIG. 8, a shape of an orthographic shape of the supporting pillar 12 on the touch control face S0 includes at least one of: a circular shape, an elliptical shape, a polygonal shape, a fan shape, an annular shape, and an irregular pattern, wherein the polygonal shape may be a triangular shape, a quadrilateral shape such as a square shape or a rectangular shape, a pentagonal shape, a hexagonal shape, and the like.

Illustratively, as shown in FIG. 1, FIG. 3 or FIG. 5, and FIG. 8, the orthographic projection of the supporting pillar 12 on the touch control face S0 is in the square shape; and as shown in FIG. 4, the orthographic projection of the supporting pillar 12 on the touch control face S0 is in the circular shape.

Illustratively, a shape of the touch control face S0 includes at least one of: the circular shape, the elliptical shape, the polygonal shape, the fan shape, the annular shape, and the irregular pattern. As shown in any one of FIG. 1, FIG. 3 to FIG. 5, and FIG. 8, the touch control face S0 is in the rectangular shape.

Figures 10, 11:
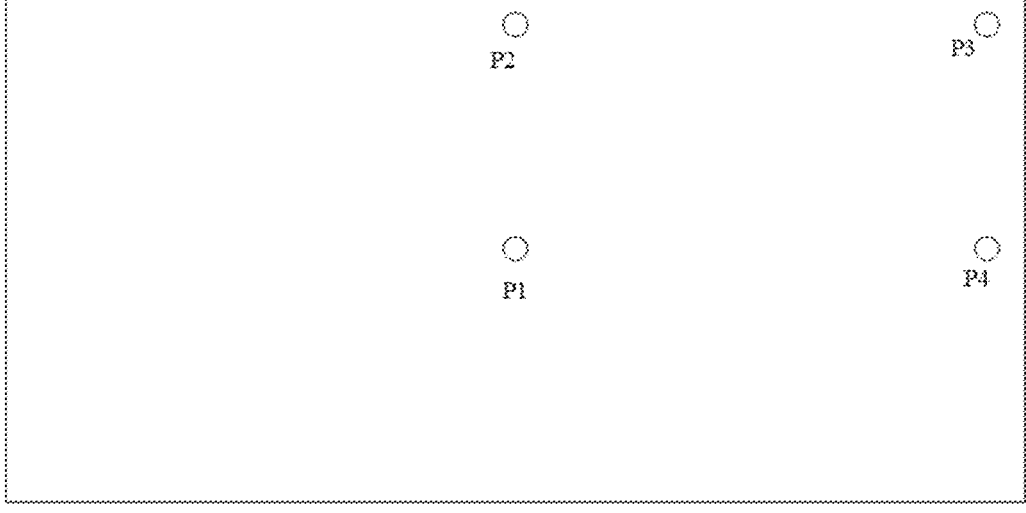
FIG. 10 shows a schematic diagram of a plurality of test positions on a touch control face.
FIG. 11 shows test results for a plurality of test positions on the touch control face.
Figure 12:
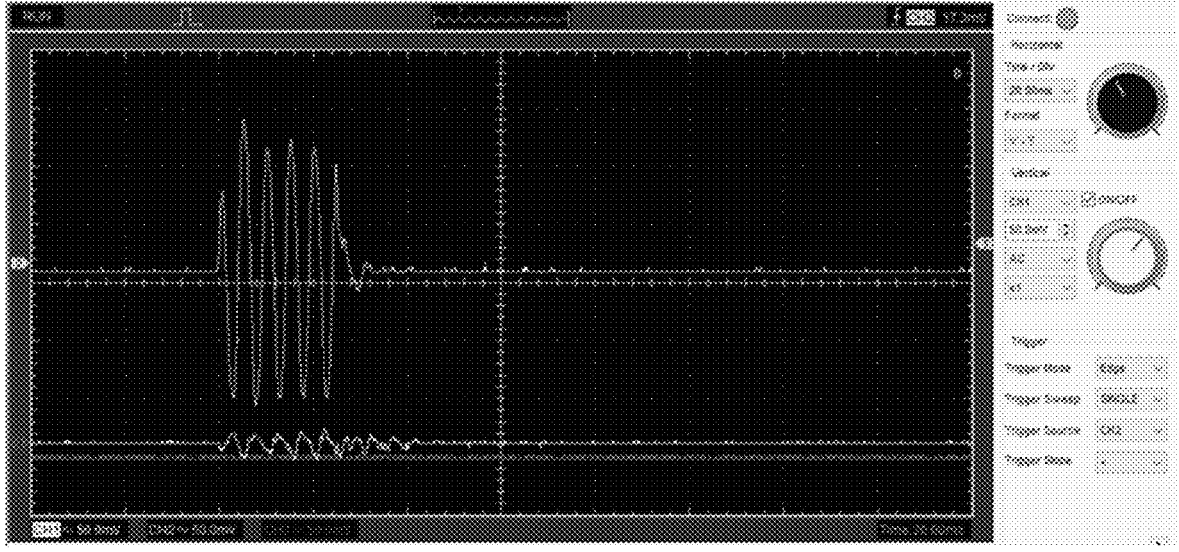
FIG. 12 shows a test waveform for a test position P1 on the touch control face.

The inventor tests the haptic feedback module shown in FIG. 5 and tests acceleration values at different positions when the actuator 13 drives the touch control module 11 to vibrate. Referring to FIG. 10, four test positions are shown, wherein the test position P1 is disposed close to the geometric center of the touch control face S0, and the other three test positions P2 to P4 are disposed close to the edge of the touch control face S0. Referring to FIG. 11, the acceleration values tested at the four test positions are shown. According to test results, a relative deviation of the acceleration values at different positions is calculated to be less than 1.5%, which indicates that the acceleration distribution at different positions on the touch control face S0 is relatively uniform, and the touch sense at different positions is basically consistent. Referring to FIG. 12, an output waveform of an accelerometer at the test position P1 is shown, and the corresponding acceleration value is 3.63 g, wherein g is gravitational acceleration.

Figure 13:
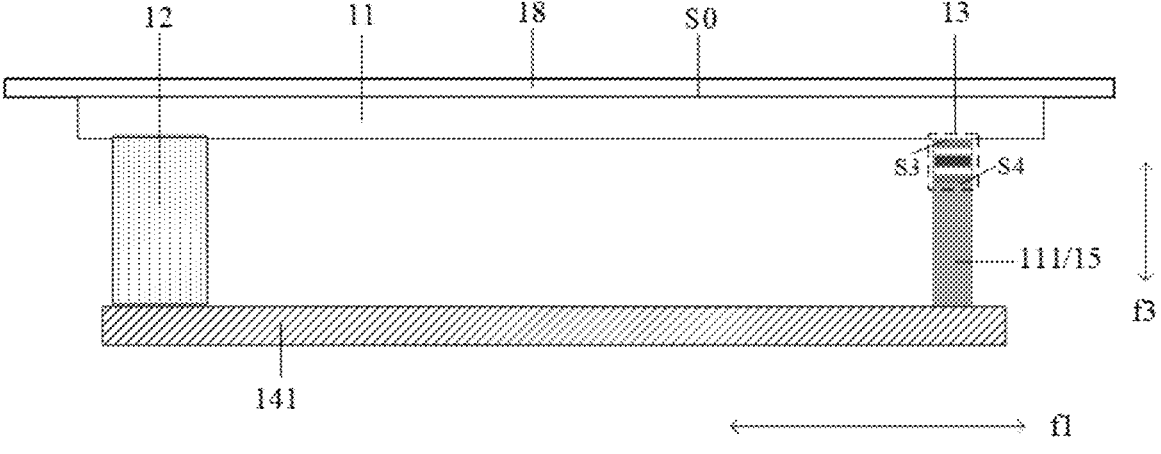
FIG. 13 illustratively shows a schematic diagram of a cross-sectional structure of another haptic feedback module.

The present disclosure provides a haptic feedback module. As shown in FIG. 2, FIG. 6 or FIG. 13, the haptic feedback module includes: a touch control module 11 having a touch control face S0; a bottom plate 141 disposed on one side of the touch control module 11 facing away from the touch control face S0; and a supporting portion 15 and an actuator 13, wherein the supporting portion 15 is used for fixing the actuator 13 between the touch control module 11 and the bottom plate 141, and the actuator 13 is used for driving the touch control module 11 to vibrate in response to a driving signal so as to form haptic feedback on the touch control face S0; wherein the supporting portion 15 is in rigid connection with the actuator 13, the actuator 13 is in rigid connection with the touch control module 11, and the supporting portion 15 is in rigid or flexible connection with the bottom plate 141.

By rigidly connecting the supporting portion 15 to the actuator 13, the steadiness of the actuator 13 may be improved.

The actuator 13 is in rigid connection with the touch control module 11, thereby ensuring that the actuator 13 can drive the touch control module 11 to vibrate together without causing too much vibration attenuation at a connecting position. Among them, the actuator 13 being in rigid connection with the touch control module 11 means that rigid materials which are not likely to deform are adopted on a connecting path between the actuator 13 and the touch control module 11.

By flexibly connecting the supporting portion 15 to the bottom plate 141, excited vibration of the bottom plate 141 may be avoided.

Since the touch control module 11 for vehicle-mounted display has the features of large size, high rigidity and large mass, the supporting portion 15 is in rigid connection with the bottom plate 141, thereby improving the mechanical stability of the touch control module 11 for vehicle-mounted display, and being conducive to increasing the vibration amplitude of the touch control module 11.

In some embodiments, as shown in FIG. 2, FIG. 6 or FIG. 9, the actuator 13 includes a first surface S1 and a second surface S2 which are disposed opposite to each other in a first direction f1, wherein the first direction f1 is parallel to the touch control face S0, and the supporting portion 15 includes: a first supporting portion 16 connected between the first surface S1 and the touch control module 11; and a second supporting portion 17 connected between the second surface S2 and the bottom plate 141.

This embodiment is conducive to the actuator 13 driving the touch control module 11 to generate transverse vibration in a direction parallel to the touch control face S0 (namely, a horizontal direction).

Specifically, the first supporting portion 16 is in rigid connection with the actuator 13, and the first supporting portion 16 is in rigid connection with the touch control module 11; and the second supporting portion 17 is in flexible connection or rigid connection with the bottom plate 141. The second support 17 may be in rigid connection or flexible connection with the second surface S2.

In some embodiments, as shown in FIG. 13, the actuator 13 includes a third surface S3 and a fourth surface S4 which are disposed opposite to each other in a normal direction f3 of the touch control face S0, wherein the third surface S3 is connected to the touch control module 11, and the supporting portion 15 includes: a third supporting portion 111 connected between the fourth surface S4 and the bottom plate 141.

This embodiment is conducive to the actuator 13 driving the touch control module 11 to generate longitudinal vibration in a direction perpendicular to the touch control face S0 (namely, a perpendicular direction).

Specifically, the third surface S3 is in rigid connection with the touch control module 11, the third supporting portion 111 is in rigid connection or flexible connection with the bottom plate 141, and the third supporting portion 111 is in rigid connection or flexible connection with the fourth surface S4.

In some embodiments, as shown in FIG. 2, FIG. 6 or FIG. 13, the haptic feedback module further includes: a supporting pillar 12 located between the touch control module 11 and the bottom plate 141, wherein one end of the supporting pillar 12 is connected to the touch control module 11 and the other end of the supporting pillar 12 is connected to the bottom plate 141.

It should be noted that reference may be made to the description of the embodiments of the above haptic feedback module for the first supporting portion 16, the second supporting portion 17, the actuator 13, the supporting pillar 12, and the like, which will not be described in detail herein.

The present disclosure provides a haptic feedback module. As shown in FIG. 2, FIG. 6 or FIG. 13, the haptic feedback module includes: a touch control module 11 having a touch control face S0; a bottom plate 141 disposed on one side of the touch control module 11 facing away from the touch control face S0; an actuator 13 located between the touch control module 11 and the bottom plate 141, wherein the actuator 13 is used for driving the touch control module 11 to vibrate in response to a driving signal, so as to form haptic feedback on the touch control face S0; and a supporting pillar 12 located between the touch control module 11 and the bottom plate 141; wherein a host material of the supporting pillar 12 is a rigid material, one end of the supporting pillar 12 is in flexible connection with the touch control module 11, and the other end of the supporting pillar 12 is in rigid connection with a bottom plate 141 bracket.

Among them, the supporting pillar 12 has the function of fixing the touch control module 11, and the supporting pillar 12 is used for forming a gap for accommodating the actuator 13 between the touch control module 11 and the bottom plate 141.

In the present disclosure, since the rigid material has resistance to deformation, the rigid supporting pillar 12 and rigid connection between the supporting pillar 12 and the bottom plate 141 can improve the stability of the touch control module 11. In addition, by flexibly connecting the supporting pillar 12 to the touch control module 11, a certain movement or deformation space can be ensured when the touch control module 11 is driven by the actuator 13 to vibrate, so as to avoid the attenuation of the vibration of the touch control module 11.

Illustratively, the rigid supporting pillar 12 and the bottom plate 141 may be adhered by a hard adhesive such as an epoxy adhesive, may also be connected by a metal welding mode, may also be connected by a rigid connector 71 such as a screw 711, may also be of an integral structure, and the like.

Illustratively, the rigid supporting pillar 12 and the touch control module 11 may be adhesively fixed by adopting a soft adhesive, for example, a flexible adhesive tape such as a double-sided adhesive tape, a VHB adhesive tape (a polyacrylate double-sided foam tape), and silica gel, and a liquid adhesive such as polyurethane glue may also be adopted, which is not limited in the present disclosure.

Illustratively, a modulus of elasticity of the supporting pillar 12 is greater than or equal to 10 GPa, and less than or equal to 300 GPa, such as tens of GPa. The material of the supporting pillar 12 may be selected from an aluminum alloy, a titanium alloy, tungsten steel, stainless steel, and the like, which is not limited in the present disclosure.

In some embodiments, as shown in FIG. 2, FIG. 6 or FIG. 13, the haptic feedback module further includes: a supporting portion 15 for fixing the actuator 13 between the touch control module 11 and the bottom plate 141.

It should be noted that reference may be made to the description of the embodiments of the above haptic feedback module for the actuator 13, the supporting portion 15, the supporting pillar 12, and the like, which will not be described in detail herein.

The present disclosure further provides a haptic feedback device. Referring to FIG. 14, the haptic feedback device includes: the haptic feedback module provided in any one of the embodiments, wherein the touch control module 11 includes at least one of: a touch control circuit, a display panel, and a backlight module; and a driving component 164 respectively connected to the touch control module 11 and the actuator 13, and used for driving the display panel to display an image, and outputting a driving signal to the actuator 13 according to touch control information of a touch control body on the touch control module 11, so that the actuator 13 drives the touch control module 11 to vibrate in response to the driving signal to so as to form haptic feedback on the touch control face S0, wherein the touch control information includes at least one of: a touch control position, a touch control time, and a touch control action.

It will be understood by those skilled in the art that the haptic feedback device provided in the present disclosure has the advantages of the above haptic feedback module. The haptic feedback device provided in the present disclosure may be integrated in products such as notebooks, and displays, and may be used as a display screen in numerous fields such as vehicle-mounted display, and consumer electronics to provide a user with rich and realistic haptic experience.

As shown in FIG. 14, the driving component 164 controls to display an interactive image on the display panel. When the touch control body performs touch control operation on the touch control module 11, the touch control information may be detected by the touch control module 11, the driving component 164 generates the driving signal according to the detected touch control information, and the driving signal is used for driving the actuator 13 to drive the touch control module 11 to generate vibration, so as to generate the haptic feedback effect on the surface of the touch control module 11. According to haptic feedback, an operator may confirm whether own operation is correct and whether the desired effect can be achieved.

Figure 15:
FIG. 15 illustratively shows a demonstration interface displayed on the touch control face.

Referring to FIG. 15, a demonstration interface displayed on the touch control face S0 of the vehicle-mounted haptic feedback device is shown.

Among them, the touch control action may be, for example, an operation gesture of the finger, such as clicking, sliding, and a sliding track.

It should be noted that the touch control circuit may be integrated inside the display panel, and may also be disposed separately from the display panel, for example, attached to a light-emitting side of the display panel, which is not limited in the present disclosure.

Among them, the touch control position may be obtained according to a detection result of the touch control circuit in the touch control module 11, which is not limited in the present disclosure.

In order to enable the touch control module 11 to detect the touch control position, and the like, in some embodiments, the touch control module 11 may include a capacitive touch control circuit or a resistive touch control circuit, which is not limited in the present disclosure.

With regard to the capacitive touch control circuit, when the touch control body, such as the user's finger, touches the touch control module 11, touch control capacitance of a touch control driving electrode and a touch control sensing electrode in the touch control circuit at the touch control position changes, touch control wirings in the touch control circuit may send the touch control capacitance at each position to the driving component 164, and the driving component 164 may determine the touch control position according to the touch control capacitance at each position.

In some embodiments, the driving component 164 may include a controller and a driver. Illustratively, when the touch control body applies the touch control operation to the touch control module 11, the controller outputs a driving signal in the form of a digital signal to the driver according to the touch control information detected by the touch control module 11 in response to the touch control operation, the driver generates a driving signal in the form of an analogue signal after performing digital-to-analogue conversion on the driving signal in the form of the digital signal, and sends the driving signal to the actuator 13, and the actuator 13 vibrates under the driving of the driving signal, so as to drive the touch control module 11 to vibrate, and then form haptic feedback.

Illustratively, the controller may include, for example, at least one of: a Microcontroller Unit (MCU), a Field Programmable Gate Array (FPGA), and the like, which is not limited in this example.

Illustratively, when the haptic feedback device is applied in a terminal, the driving component 164 may be a processor in the terminal.

In some embodiments, as shown in FIG. 14, the haptic feedback device may further include: an amplifying circuit 165 respectively connected to the driving component 164 and the actuator 13, and used for amplifying the driving signal output by the driving component 164 and sending the amplified signal to the actuator 13.

Illustratively, the driving component 164 may include an audio chip, wherein the audio chip may generate the driving signal.

In some embodiments, the display panel may be a liquid crystal display panel or a self-luminous display panel, which is not limited in the present disclosure. Among them, the self-luminous display panel has a light-emitting device built therein, and the light-emitting device may be, for example, an Organic Light-Emitting Diode (OLED), a Quantum Dot Light-Emitting Diode (QLED), a Mini Light-Emitting Diode (Mini LED) or a Micro Light-Emitting Diode (Micro LED), and the like.

In the present disclosure, the meaning of "plurality of" refers to two or more, and the meaning of "at least one" refers to one or more, unless otherwise specified.

In the present disclosure, the terms "up", "down", etc. indicate orientation or positional relationships based on the orientation or positional relationships shown in the accompanying drawings, only for the convenience of describing the present disclosure and simplifying the description, and do not indicate or imply that the device or component referred to must have a specific orientation, be constructed and operated in a specific orientation, and therefore cannot be understood as a limitation of the present disclosure.

In the specification, the terms "including/comprising", "containing", or any other variation thereof are intended to encompass non-exclusive inclusion, such that a process, method, product, or equipment that includes a series of elements includes not only those elements, but also other elements not explicitly listed, or elements inherent to such process, method, product, or equipment. Without further limitations, the element defined by the statement "including one . . . " does not exclude the existence of other identical elements in the process, method, product, or device that includes the element in question.

The terms "one embodiment", "some embodiments", "exemplary embodiments", "one or more embodiments", "examples", "one example", "some examples", etc. referred to in the specification are intended to indicate that specific features, structures, materials, or characteristics related to the embodiment or example are included in at least one embodiment or example disclosed herein. The schematic representation of the above terms does not necessarily refer to the same embodiment or example. In addition, the specific features, structures, materials, or characteristics described may be included in any appropriate manner in any one or more embodiments or examples.

In the specification, relational terms such as first and second are only used to distinguish one entity or operation from another, and do not necessarily require or imply any actual relationship or order between these entities or operations.

When describing some embodiments, expressions such as "coupling" and "connection" may be used. For example, in describing some embodiments, the term "connection" may be used to indicate that two or more components have direct physical or electrical contact with each other. For example, in describing some embodiments, the term "coupling" may be used to indicate that two or more components have direct physical or electrical contact. However, the term "coupled" or "communicably coupled" may also refer to two or more components that do not have direct contact with each other but still cooperate or interact with each other. The embodiments disclosed here are not necessarily limited to the content of the specification.

"At least one of A, B, and C" has the same meaning as "at least one of A, B, or C" and includes the following combinations of A, B, and C: only A, only B, only C, a combination of A and B, a combination of A and C, a combination of B and C, and a combination of A, B, and C.

"A and/or B" includes the following three combinations: only A, only B, and a combination of A and B.

As used in the specification, the term "if" is optionally interpreted as meaning "when" or "at" or "in response to a determination" or "in response to a detection" depending on the context. Similarly, depending on the context, the phrases "if determined . . . " or "if [stated condition or event] is detected" may be interpreted as referring to "when determined . . . " or "in response to determining . . . " or "when [stated condition or event] is detected" or "in response to detecting [stated condition or event]".

The use of "used for" or "configured as" in the specification implies an open and inclusive language, which does not exclude devices that are applicable or configured to perform additional tasks or steps.

The use of "based on" or "according to" in the specification implies openness and inclusiveness. A process, step, calculation, or other action based on one or more of the conditions or values described, which may be based on other conditions or beyond the values described in practice. The process, steps, calculations, or other actions based on one or more of the stated conditions or values may, in practice, be based on other conditions or beyond the stated values.

As used in the specification, "about", "roughly", or "approximately" include the values described and the average value within an acceptable deviation range of a specific value, where the acceptable deviation range is determined by persons skilled in the art taking into account the measurement being discussed and the errors associated with the measurement of a specific quantity (i.e., limitations of the measurement system).

As used in the specification, "parallel", "vertical", "equal", and "flush" include the situations described and situations that are similar to the described situations, and the range of the similar situations is within an acceptable deviation range, where the acceptable deviation range is determined by persons skilled in the art considering the measurement being discussed and the errors associated with the measurement of a specific quantity (i.e., the limitations of the measurement system). For example, "parallel" includes absolute parallelism and approximate parallelism, where the acceptable deviation range for approximate parallelism may be within 5° of deviation; "vertical" includes absolute vertical and approximate vertical, where the acceptable deviation range for approximate vertical may also be within 5° of deviation, for example. "Equal" includes absolute equality and approximate equality, where the acceptable deviation range for approximate equality may be, for example, that the difference between the equal two is less than or equal to 5% of either one. "Flush" includes absolute flush and approximate flush, where the acceptable deviation range for approximate flush may be, for example, that the distance between the flush two is less than or equal to 5% of either dimension.

It should be understood that when a layer or component is referred to as being on another layer or substrate, it may be directly on another layer or substrate, or there may be an intermediate layer between the layer or component and another layer or substrate.

The specification describes exemplary implementations with reference to sectional diagram and/or plane diagram as idealized illustrative figures. In the attached figures, the thickness of the layers and areas has been enlarged for clarity. Therefore, it may be assumed that there may be changes in the shape relative to the drawings due to factors such as manufacturing technology and/or tolerances. Therefore, the exemplary implementations should not be interpreted as limited to the shapes of the areas shown in the specification, but rather include shape deviations caused by, for example, manufacturing. For example, etched areas shown as rectangles typically have curved features. Therefore, the areas shown in the figures are essentially illustrative, and their shapes are not intended to show the actual shape of the area of the device, nor are they intended to limit the scope of the exemplary implementations.

Finally, it should be noted that the above embodiments are only used to illustrate the technical solution of the present disclosure and not to limit it. Although the present disclosure has been described in detail with reference to the aforementioned embodiments, those skilled in the art should understand that they may still modify the technical solutions described in the aforementioned embodiments, or equivalently replace some of the technical features. And these modifications or substitutions do not depart from the essence and scope of the corresponding technical solutions disclosed in the present disclosure.

The invention claimed is:

1. A haptic feedback module, comprising:
a touch control module having a touch control face;
a bottom plate disposed on one side of the touch control module facing away from the touch control face; and
an actuator disposed between the touch control module and the bottom plate, wherein the actuator is connected to the touch control module through a first supporting portion, the actuator is connected to the bottom plate through a second supporting portion, and the actuator is used for driving the touch control module to vibrate in response to a driving signal, so as to form haptic feedback on the touch control face,
  wherein the actuator comprises a first surface and a second surface, the first supporting portion is connected to the first surface, and the second supporting portion is connected to the second surface; and the first surface and the second surface are disposed opposite to each other in a first direction, and the first direction is parallel to the touch control face,
  wherein the first supporting portion comprises a first supporting face and a second supporting face which are cross-connected to each other, the first supporting face is parallel to the touch control face, the second supporting face is located on one side of the first supporting face away from the touch control module, the first supporting face is connected to the touch control module, and the second supporting face is connected to the first surface,
  wherein the second supporting portion comprises a third supporting face and a fourth supporting face which are cross-connected to each other, the third supporting face is parallel to the bottom plate, the fourth supporting face is located on one side of the third supporting face away from the bottom plate, the third supporting face is connected to the bottom plate, and the fourth supporting face is connected to the second surface, and
  wherein in a second direction, the first surface is connected to a middle area of the second supporting face, the second surface is connected to a middle area of the fourth supporting face, an edge area of the second supporting face is connected to an edge area of the fourth supporting face through a rigid connector, and the second direction is parallel to the touch control face and perpendicular to the first direction.

2. The haptic feedback module according to claim 1, wherein the entire first surface is contact connection with the second supporting face, and the entire second surface is in contact connection with the fourth supporting face.

3. The haptic feedback module according to claim 2, wherein in a normal direction of the touch control face, a size of the second supporting face is greater than a size of the actuator, and a size of the fourth supporting face is greater than the size of the actuator.

4. The haptic feedback module according to claim 3, wherein in the normal direction of the touch control face, the first surface is connected to a part of the second supporting face away from the touch control module, and the second surface is connected to a part of the fourth supporting face close to the touch control module.

5. The haptic feedback module according to claim 1, wherein a shape of the first supporting face comprises at least one of: a polygonal shape, a circular shape, an elliptical shape, a fan shape, an annular shape, and an irregular pattern; and a shape of the third supporting face comprises at least one of: the polygonal shape, the circular shape, the elliptical shape, the fan shape, the annular shape, and the irregular pattern.

6. The haptic feedback module according to claim 1, wherein the first supporting portion comprises a first supporting plate, the first supporting face is a surface of the first supporting plate close to the touch control module, a width of the first supporting plate is greater than or equal to a thickness of the first supporting plate, the width of the first supporting plate is a size of the first supporting plate in a direction parallel to the touch control face, and the thickness of the first supporting plate is a size of the first supporting plate in a direction perpendicular to the touch control face; and the second supporting portion comprises a second supporting plate, the third supporting face is a surface of the second supporting plate close to the bottom plate, a width of the second supporting plate is greater than or equal to a thickness of the second supporting plate, the width of the second supporting plate is a size of the second supporting plate in the direction parallel to the touch control face, and the thickness of the second supporting plate is a size of the second supporting plate in the direction perpendicular to the touch control face.

7. The haptic feedback module according to claim 1, wherein the haptic feedback module comprises a first actuation group and a second actuation group, the first actuation group and the second actuation group comprise a same quantity of actuators, and the first actuation group and the second actuation group are disposed symmetrically.

8. The haptic feedback module according to claim 7, wherein an orthographic projection of the first actuation group on the touch control face is disposed close to a first edge of the touch control face, an orthographic projection of the second actuation group on the touch control face is disposed close to a second edge of the touch control face, and the first edge and the second edge are disposed opposite to each other.

9. The haptic feedback module according to claim 8, wherein the orthographic projection of the first actuation group on the touch control face is disposed close to a center of the first edge, and the orthographic projection of the second actuation group on the touch control face is disposed close to a center of the second edge.

10. The haptic feedback module according to claim 8, wherein the actuators comprise piezoelectric patches, the piezoelectric patches of the actuators located in the first actuation group are parallel to the first edge, and the piezoelectric patches of the actuators located in the second actuation group are parallel to the second edge.

11. The haptic feedback module according to claim 1, wherein the actuators comprise a first actuator, and an orthographic projection of the first actuator on the touch control face is disposed close to an edge of the touch control face;
  wherein the first supporting portion connected to the first actuator is located on one side of the second supporting portion close to the edge.

12. The haptic feedback module according to claim 1, wherein a shape of the touch control face is a quadrilateral shape, the actuators comprise a second actuator, the second actuator comprises a piezoelectric patch, and an included angle between an orthographic projection of the piezoelectric patch in the second actuator on the touch control face and one side edge of the quadrilateral shape is greater than or equal to 10° and less than or equal to 80°.

13. A haptic feedback module, comprising:
  a touch control module having a touch control face;
  a bottom plate disposed on one side of the touch control module facing away from the touch control face; and
  a supporting portion and an actuator, wherein the supporting portion is used for fixing the actuator between the touch control module and the bottom plate, and the actuator is used for driving the touch control module to vibrate in response to a driving signal, so as to form haptic feedback on the touch control face;
  wherein the supporting portion is in rigid connection with the actuator, the actuator is in rigid connection with the touch control module, and the supporting portion is in rigid or flexible connection with the bottom plate,
  wherein the actuator comprises a first surface and a second surface, the first supporting portion is connected to the first surface, and the second supporting portion is connected to the second surface; and the first surface and the second surface are disposed opposite to each other in a first direction, and the first direction is parallel to the touch control face,
    wherein the first supporting portion comprises a first supporting face and a second supporting face which are cross-connected to each other, the first supporting face is parallel to the touch control face, the second supporting face is located on one side of the first supporting face away from the touch control module, the first supporting face is connected to the touch control module, and the second supporting face is connected to the first surface,
    wherein the second supporting portion comprises a third supporting face and a fourth supporting face which are cross-connected to each other, the third supporting face is parallel to the bottom plate, the fourth supporting face is located on one side of the third supporting face away from the bottom plate, the third supporting face is connected to the bottom plate, and the fourth supporting face is connected to the second surface, and
    wherein in a second direction, the first surface is connected to a middle area of the second supporting face, the second surface is connected to a middle area of the fourth supporting face, an edge area of the second supporting face is connected to an edge area of the fourth supporting face through a rigid con

26 nector, and the second direction is parallel to the touch control face and perpendicular to the first direction.

14. The haptic feedback module according to claim 13, wherein the actuator comprises a first surface and a second surface which are disposed opposite to each other in a first direction, the first direction is parallel to the touch control face, and the supporting portion comprises:
  a first supporting portion connected between the first surface and the touch control module; and
  a second supporting portion connected between the second surface and the bottom plate.

15. A haptic feedback module, comprising:
  a touch control module having a touch control face;
  a bottom plate disposed on one side of the touch control module facing away from the touch control face;
  an actuator located between the touch control module and the bottom plate, wherein the actuator is used for driving the touch control module to vibrate in response to a driving signal, so as to form haptic feedback on the touch control face; and
  a supporting pillar located between the touch control module and the bottom plate;
  wherein a host material of the supporting pillar is a rigid material, one end of the supporting pillar is in flexible connection with the touch control module, and the other end of the supporting pillar is in rigid connection with a bottom plate bracket,
    wherein the actuator comprises a first surface and a second surface, the first supporting portion is connected to the first surface, and the second supporting portion is connected to the second surface; and the first surface and the second surface are disposed opposite to each other in a first direction, and the first direction is parallel to the touch control face,
    wherein the first supporting portion comprises a first supporting face and a second supporting face which are cross-connected to each other, the first supporting face is parallel to the touch control face, the second supporting face is located on one side of the first supporting face away from the touch control module, the first supporting face is connected to the touch control module, and the second supporting face is connected to the first surface,
    wherein the second supporting portion comprises a third supporting face and a fourth supporting face which are cross-connected to each other, the third supporting face is parallel to the bottom plate, the fourth supporting face is located on one side of the third supporting face away from the bottom plate, the third supporting face is connected to the bottom plate, and the fourth supporting face is connected to the second surface, and
    wherein in a second direction, the first surface is connected to a middle area of the second supporting face, the second surface is connected to a middle area of the fourth supporting face, an edge area of the second supporting face is connected to an edge area of the fourth supporting face through a rigid connector, and the second direction is parallel to the touch control face and perpendicular to the first direction.

16. A haptic feedback device, comprising:
  a haptic feedback module, including a touch control module having a touch control face; a bottom plate disposed on one side of the touch control module facing away from the touch control face; and an actuator disposed between the touch control module and the bottom plate, wherein the actuator is connected to the touch control module through a first supporting portion, the actuator is connected to the bottom plate through a second supporting portion, and the actuator is used for driving the touch control module to vibrate in response to a driving signal, so as to form haptic feedback on the touch control face, wherein the actuator comprises a first surface and a second surface, the first supporting portion is connected to the first surface, and the second supporting portion is connected to the second surface; and the first surface and the second surface are disposed opposite to each other in a first direction, and the first direction is parallel to the touch control face, wherein the first supporting portion comprises a first supporting face and a second supporting face which are cross-connected to each other, the first supporting face is parallel to the touch control face, the second supporting face is located on one side of the first supporting face away from the touch control module, the first supporting face is connected to the touch control module, and the second supporting face is connected to the first surface, wherein the second supporting portion comprises a third supporting face and a fourth supporting face which are cross-connected to each other, the third supporting face is parallel to the bottom plate, the fourth supporting face is located on one side of the third supporting face away from the bottom plate, the third supporting face is connected to the bottom plate, and the fourth supporting face is connected to the second surface, and wherein in a second direction, the first surface is connected to a middle area of the second supporting face, the second surface is connected to a middle area of the fourth supporting face, an edge area of the second supporting face is connected to an edge area of the fourth supporting face through a rigid connector, and the second direction is parallel to the touch control face and perpendicular to the first direction, wherein the touch control module comprises at least one of: a touch control circuit, a display panel, and a backlight module; and a driving component respectively connected to the touch control module and the actuator, and used for driving the display panel to display an image, and outputting a driving signal to the actuator according to touch control information of a touch control body on the touch control module, so that the actuator drives the touch control module to vibrate in response to the driving signal, so as to form haptic feedback on the touch control face, wherein the touch control information comprises at least one of: a touch control position, a touch control time, and a touch control action.

* * * * *